United States Patent
Zhu

(10) Patent No.: US 11,218,640 B2
(45) Date of Patent: Jan. 4, 2022

(54) TELEPHOTO CAMERA VIEWFINDER

(71) Applicant: Motorola Mobility LLC, Chicago, IL (US)

(72) Inventor: Xiaofeng Zhu, Nanjing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/918,407

(22) Filed: Jul. 1, 2020

(65) Prior Publication Data
US 2021/0344843 A1 Nov. 4, 2021

(30) Foreign Application Priority Data
Apr. 29, 2020 (CN) .......................... 202010354176.2

(51) Int. Cl.
*H04N 5/232* (2006.01)

(52) U.S. Cl.
CPC ... *H04N 5/232935* (2018.08); *H04N 5/23216* (2013.01); *H04N 5/23296* (2013.01); *H04N 5/232945* (2018.08)

(58) Field of Classification Search
CPC ....... H04N 5/232935; H04N 5/232945; H04N 5/23216; H04N 5/23296
See application file for complete search history.

(56) References Cited

U.S. PATENT DOCUMENTS

| 2013/0093689 | A1* | 4/2013 | Papakipos | H04N 5/23216 345/173 |
|---|---|---|---|---|
| 2016/0180845 | A1* | 6/2016 | Kim | H04N 5/232061 348/211.2 |
| 2018/0041679 | A1* | 2/2018 | Dalke | H04N 5/2356 |
| 2019/0082101 | A1* | 3/2019 | Baldwin | H04N 5/23216 |

* cited by examiner

*Primary Examiner* — Yogesh K Aggarwal
(74) *Attorney, Agent, or Firm* — FIG. 1 Patents

(57) ABSTRACT

In aspects of telephoto camera viewfinder, a multi-camera device has a digital camera to capture a digital image of a camera scene as viewable with the digital camera in a wide view. The multi-camera device also has a telephoto camera to capture digital content of the camera scene as viewable with the telephoto camera in a zoom view. The multi-camera device has a display screen to display a viewfinder user interface that includes the zoom view displayed as a zoom preview image captured by the telephoto camera, and the wide view displayed as a camera preview image captured by the digital camera. The viewfinder user interface also includes, displayed over the camera preview image, a bordered outline of a region of the camera scene that indicates the zoom view relative to the wide view of the camera scene.

20 Claims, 11 Drawing Sheets

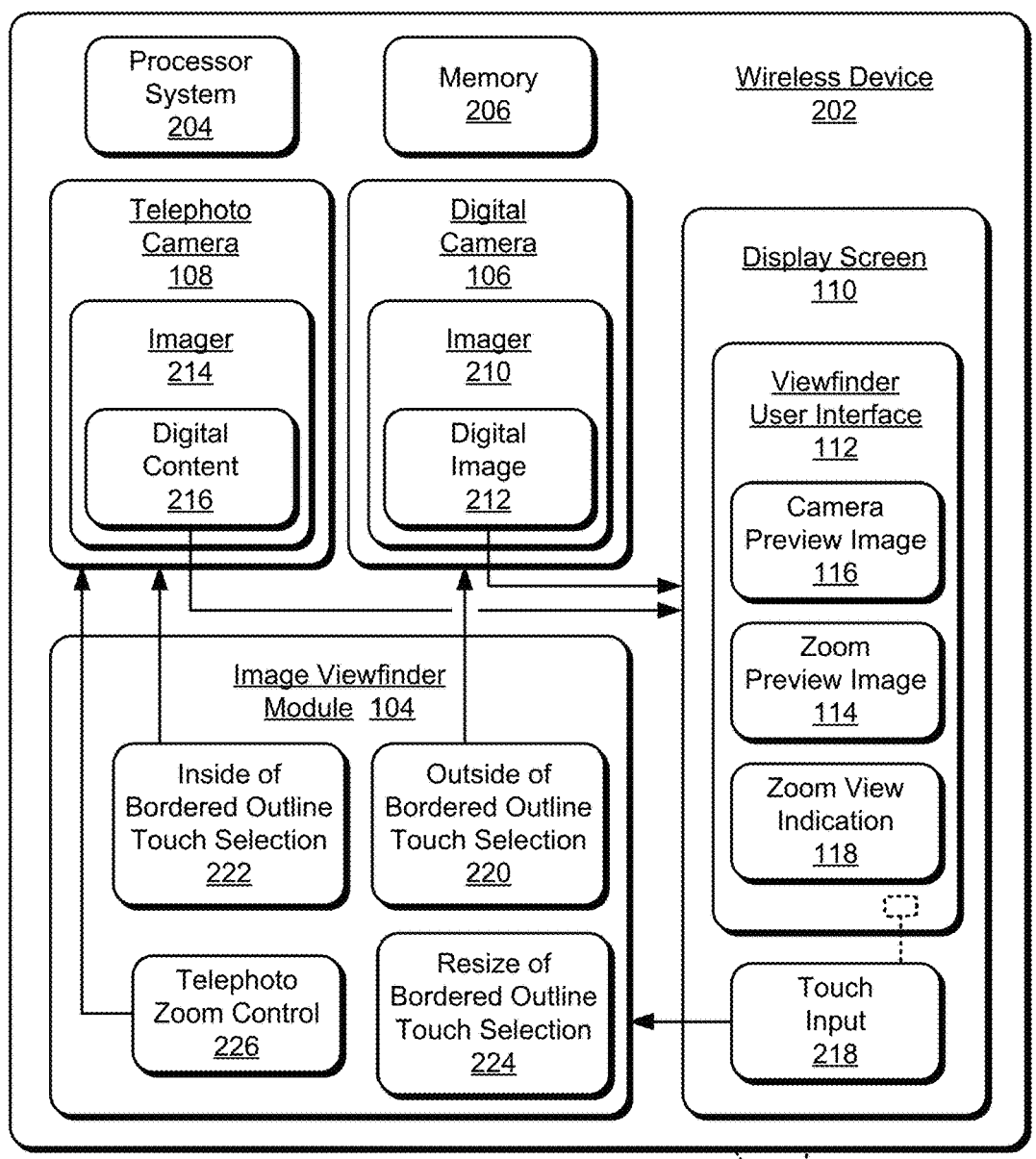
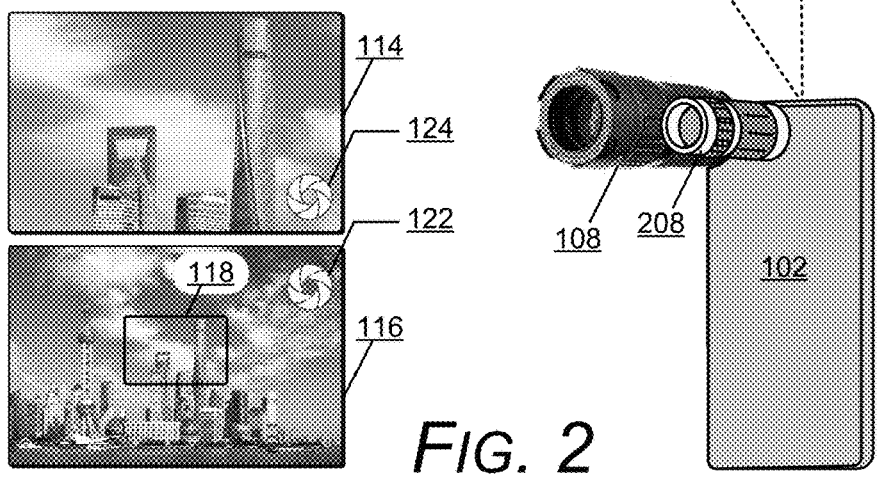
FIG. 2

TELEPHOTO CAMERA VIEWFINDER

RELATED APPLICATION

This application claims the priority benefit of China Patent Application for Invention Serial No. 202010354176.2 filed Apr. 29, 2020 entitled "Telephoto Camera Viewfinder", the disclosure of which is incorporated by reference herein in its entirety.

BACKGROUND

Devices such as smart devices, mobile devices (e.g., cellular phones, tablet devices, smartphones), consumer electronics, and the like can be implemented for use in a wide range of environments and for a variety of different applications. Many different types of these wireless devices, such as mobile phones, include multiple cameras to capture digital images, such as with an ultra-wide camera, a wide-angle camera, and/or a telephoto camera. Additionally, a telescope attachment may be added to these types of multi-camera devices to extend the focal length of the telephoto camera. However, the telescope attachment may block or otherwise obscure the field-of-view of the other device cameras, such as the ultra-wide camera and/or the wide-angle camera, making it difficult for a user of a device to locate the target of the telephoto camera and/or of the telescope attachment when seeing only the narrow, zoomed-in field-of-view through the camera viewfinder.

BRIEF DESCRIPTION OF THE DRAWINGS

Implementations of the techniques for telephoto camera viewfinder are described with reference to the following Figures. The same numbers may be used throughout to reference like features and components shown in the Figures:

FIG. 2 illustrates an example device that can be used to implement techniques for telephoto camera viewfinder as described herein.

DETAILED DESCRIPTION

Figure 1:
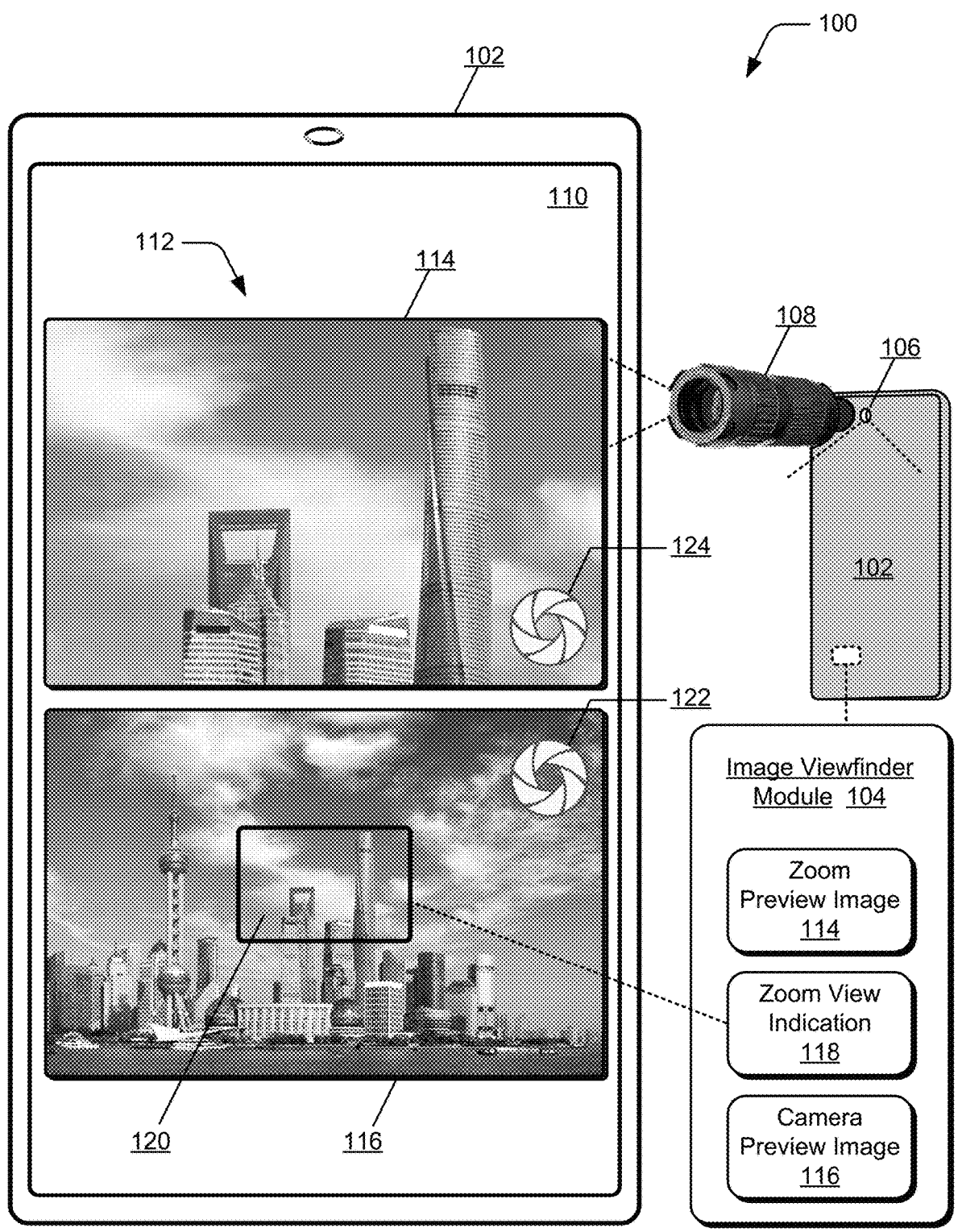
FIG. 1 illustrates an example of techniques for telephoto camera viewfinder using a multi-camera device in accordance with one or more implementations as described herein.

Implementations of telephoto camera viewfinder are described, and provide techniques implemented by a multi-camera device to provide a viewfinder user interface that includes both a zoom view of a camera scene displayed as a zoom preview image captured by a telephoto camera, and includes a wide view of the camera scene displayed as a camera preview image captured by a digital camera. The viewfinder user interface also includes a zoom view indication, which is displayed over the camera preview image to indicate the zoom view relative to the wide view of the camera scene. The zoom view indication can be displayed over the camera preview image in the viewfinder user interface as a bordered outline of a region of the camera scene that indicates the zoom view relative to the wide view. The zoom view indication that is displayed over the camera preview image functions as a virtual finder scope for the zoom view of the telephoto camera. As a user of the multi-camera device moves the device and changes the camera scene and/or adjusts the focal length to zoom-in or zoom-out the telephoto lens, the user can quickly locate the target of the telephoto camera from the zoom view shown in the region of the camera scene relative to the wide view shown in the camera preview image.

In aspects of telephoto camera viewfinder, as described herein, the multi-camera device has a digital camera to capture a digital image of the camera scene as viewable with the digital camera in the wide view. The multi-camera device also has a telephoto camera to capture digital content of the camera scene as viewable with the telephoto camera in the zoom view. The multi-camera device has a display screen to display the viewfinder user interface that includes the zoom view displayed as a zoom preview image captured by the telephoto camera, and the wide view displayed as a camera preview image captured by the digital camera. The viewfinder user interface also includes, displayed over the camera preview image, the bordered outline of a region of the camera scene that indicates the zoom view relative to the wide view of the camera scene. As used herein, the term "wide view" is relative to the "zoom view" of the telephoto camera, which generally has a narrower field-of-view than the wider field-of-view of the digital camera.

Additionally, the digital camera of the multi-camera device is described as being implemented to capture a digital image of a camera scene, and the telephoto camera is described as being implemented to capture digital content of the camera scene. This is merely for ease of discussion so as to correlate the content captured by the corresponding camera devices. In practice, a digital image (as captured by the digital camera) is also digital content, and digital content (as captured by the telephoto camera) may be captured in the form of a digital image. As used herein, the terms "digital image" and "digital content" include any type of a digital frame, digital photograph, digital image, a digital video frame of a video clip, digital video, and/or any other type of digital content.

In aspects of telephoto camera viewfinder, the viewfinder user interface can include a wide image capture icon that is selectable by a user of the multi-camera device to initiate the capture of the digital image in the wide view of the camera scene with the digital camera. The viewfinder user interface can also include a zoom image capture icon that is selectable to initiate the capture of the digital content in the zoom view of the camera scene with the telephoto camera. Additionally, the user of the multi-camera device may select both of the wide image capture icon and the zoom image capture icon approximately simultaneously to initiate the capture of both the digital image in the wide view of the camera scene with the digital camera and the digital content in the zoom view of the camera scene with the telephoto camera. The multi-camera device implements an image viewfinder module that can receive the inputs and user selections, such as touch inputs by a user of the device in the viewfinder user interface on a display screen (e.g., a touchscreen display) of the device.

As noted above, the viewfinder user interface includes the bordered outline of a region of the camera scene that indicates the zoom view relative to the wide view of the camera scene displayed over the camera preview image. As an alternative, or in addition to the image capture icons, the image viewfinder module can receive a touch input selection by a user of the device inside of the bordered outline of the region, and communicate a control instruction to initiate the telephoto camera of the multi-camera device to capture the digital content in the zoom view of the camera scene. Similarly, the image viewfinder module can receive a touch input selection outside of the bordered outline of the region, and communicate a control instruction to initiate the digital camera of the multi-camera device to capture the digital image in the wide view of the camera scene.

In other aspects of telephoto camera viewfinder, a user of the multi-camera device can resize the bordered outline of the region (i.e., the zoom view indication) on the camera preview image effective to zoom-out or further zoom-in the telephoto camera. For example, the user can touch select and drag a corner or side of the bordered outline of the region to either decrease or increase the size of the bordered outline. As the user decreases the size of the bordered outline, the telephoto camera further zooms-in, and as the user increases the size of the bordered outline, the telephoto camera zooms-out. The image viewfinder module that is implemented by the multi-camera device can receive a touch selection input to decrease the bordered outline of the region, and control the telephoto camera to further zoom-in responsive to the decrease in size of the bordered outline. This is also effective to alter the zoom preview image that is displayed in the viewfinder user interface. Similarly, the image viewfinder module can receive a touch selection input to increase the size of the bordered outline of the region, and control the telephoto camera to zoom-out responsive to the increase in size of the bordered outline. This is also effective to alter the zoom preview image that is displayed in the viewfinder user interface.

While features and concepts of telephoto camera viewfinder can be implemented in any number of different devices, systems, environments, and/or configurations, implementations of telephoto camera viewfinder are described in the context of the following example devices, systems, and methods.

FIG. 1 illustrates an example 100 of techniques for telephoto camera viewfinder using a multi-camera device 102 that implements an image viewfinder module 104, which manages aspects of telephoto camera viewfinder as described herein. In this example 100, the multi-camera device 102 may be any type of a mobile device, computing device, tablet device, mobile phone, flip phone, and/or any other type of multi-camera device. Generally, the multi-camera device 102 may be any type of an electronic and/or computing device implemented with various components, such as a processor system and memory, as well as any number and combination of different components as further described with reference to the example device shown in FIG. 11.

In this example 100, the multi-camera device 102 has a digital camera 106 and a telephoto camera 108, generally shown as a camera or telephoto camera with an attached telephoto lens (also referred to as a telescope attachment). Generally, the digital camera 106 includes a lens that is integrated in the back cover or housing of the device, and has an imaging sensor, referred to as an imager. The camera imager receives light directed through the camera lens, which is then captured as a digital image of a camera scene as viewable with the digital camera 106 in a wide view. For example, the digital image that is captured by the digital camera 106 may be a digital photo of an environment as viewable with the camera. The digital camera 106 has a field-of-view (FOV) of the camera, referred to herein as a wide view of the camera scene. As further noted below, the "wide view" is relative to the "zoom view" of the telephoto camera 108, which generally has a narrower field-of-view than the wider field-of-view of the digital camera 106.

Similarly, the telephoto camera 108 of the multi-camera device 102 includes a lens that is integrated in the back cover or housing of the device, and also has an imager that receives light directed through the camera lens, which is then captured as digital content of the camera scene as viewable with the telephoto camera 108 in a zoom view. For example, the digital content that is captured by the telephoto camera 108 may be a digital photo of the environment as viewable with the camera. The telephoto camera 108 has a field-of-view (FOV) of the camera, referred to herein as a zoom view of the camera scene. As noted above, the "zoom view" is relative to the "wide view" of the digital camera 106, which generally has a wider field-of-view than the narrower field-of-view of the telephoto camera 108. In implementations, the digital camera 106 and the telephoto camera 108 may capture digital content at different focal lengths and/or different apertures.

Notably, the digital camera 106 is described as being implemented to capture a digital image of a camera scene, and the telephoto camera 108 is described as being implemented to capture digital content of the camera scene. This is merely for ease of discussion so as to correlate the content captured by the corresponding cameras. In practice, a digital image is also digital content, and digital content may be captured in the form of a digital image. As used herein, the terms "digital image" and "digital content" include any type of a digital frame, digital photograph, digital image, a digital video frame of a video clip, digital video, and/or any other type of digital content.

The multi-camera device 102 has a display screen 110 on which a viewfinder user interface 112 can be displayed. The viewfinder user interface 112 includes the zoom view displayed as a zoom preview image 114 captured by the telephoto camera 108, and includes the wide view displayed as a camera preview image 116 captured by the digital camera 106. The multi-camera device 102 implements the image viewfinder module 104 that manages the display of content in the viewfinder user interface 112, such as the zoom preview image 114 and the camera preview image 116. The image viewfinder module 104 also initiates and controls the display of a zoom view indication 118, which is displayed in the viewfinder user interface 112 over the camera preview image 116 to indicate the zoom view relative to the wide view of the camera scene.

For example, the indication 118 of the zoom view can be displayed over the camera preview image 116 as a bordered outline of a region 120 of the camera scene that indicates the zoom view relative to the wide view. Notably, the region 120 of the camera scene corresponds to the zoom preview image 114 that is also displayed in the viewfinder user interface 112, which in this example, is shown displayed above the camera preview image 116. In implementations, the zoom view indication 118 that is displayed over the camera preview image 116 functions as a virtual finder scope for the zoom view of the telephoto camera 108. As a user of the multi-camera device 102 moves the device and changes the camera scene and/or adjusts the focal length to zoom-in or zoom-out the telephoto lens, the user can quickly locate the target of the telephoto camera 108 from the zoom view shown in the region 120 of the camera scene relative to the wide view shown in the camera preview image 116.

Although described in this example as one viewfinder user interface 112 that displays both the zoom preview image 114 and the camera preview image 116, the zoom preview image 114 and the camera preview image 116 may each be displayed in separate viewfinder user interfaces, which can then be displayed concurrently on the display screen 110 of the multi-camera device 102. Further, although the zoom view indication 118 is shown in this example 100 as a solid line (e.g., the bordered outline of the region 120), the zoom view indication 118 may be implemented as any type of solid, dashed, colored, or other featured line or outline, and with any type of shaded or high-lighted features to indicate the region 120 of the camera scene that indicates the zoom view relative to the wide view.

In this example implementation, the viewfinder user interface 112 also includes a wide image capture icon 122 that is selectable by a user of the multi-camera device 102 to initiate the capture of the digital image in the wide view of the camera scene with the digital camera 106. The viewfinder user interface 112 also includes a zoom image capture icon 124 that is selectable by the user of the multi-camera device 102 to initiate the capture of the digital content in the zoom view of the camera scene with the telephoto camera 108. Additionally, the user of the multi-camera device 102 may select both the wide image capture icon 122 and the zoom image capture icon 124 approximately simultaneously to initiate the capture of both the digital image in the wide view of the camera scene with the digital camera 106 and the digital content in the zoom view of the camera scene with the telephoto camera 108.

FIG. 2 illustrates an example 200 of a wireless device 202 that can be used to implement the techniques of telephoto camera viewfinder, as described herein, such as the multi-camera device 102 that is shown and described with reference to FIG. 1. In this example 200, the wireless device 202 may be any type of a computing device, tablet device, mobile phone, flip phone, and/or any other type of mobile device. Generally, the wireless device 202 may be any type of an electronic and/or computing device implemented with various components, such as a processor system 204, to include an integrated or independent video graphics processor, and memory 206, as well as any number and combination of different components as further described with reference to the example device shown in FIG. 5. For example, the wireless device 202 can include a power source to power the device, such as a rechargeable battery and/or any other type of active or passive power source that may be implemented in an electronic and/or computing device.

In implementations, the wireless device 202 may be a mobile phone (also commonly referred to as a "smartphone") implemented as a multi-camera device. The wireless device 202 includes a digital camera 106 and a telephoto camera 108. Although the devices are generally described herein as multi-camera devices having two cameras, any one or more of the devices may include more than two cameras. For example, an implementation of the wireless device 202 and/or the multi-camera device 102 may include two or more individual cameras, such as to capture digital content at different focal lengths and/or different apertures. As further shown in this example 200, the multi-camera device 102 includes the telescope attachment to implement the telephoto camera 108 and enable the zoom view, and includes a finder scope 208 attached to the multi-camera device for an unobstructed field of view by the digital camera 106. The finder scope 208 extends out from the multi-camera device alongside the telescope attachment so that the telescope attachment does not obstruct the field-of-view of the digital camera 106.

In this example 200, the digital camera 106 includes an imager 210 to capture a digital image 212, such as a digital photo or digital video content. For example, the digital image 212 that is captured by the imager 210 of the digital camera 106 may be a digital photo of an environment as viewable with the digital camera, such as a digital image of a camera scene as viewable with the digital camera 106 in a wide view. The digital image 212 that is captured by the digital camera 106 of the wireless device 202 is an example of the camera preview image 116 that is displayable in the viewfinder user interface 112 on the display screen 110 of the device.

Similarly, the telephoto camera 108 includes an imager 214 to capture digital content 216, such as a digital photo or digital video content. For example, the digital content 216 that is captured by the imager 214 of the telephoto camera 108 may be a digital photo of the environment as viewable with the telephoto camera, such as a digital image of the camera scene as viewable with the telephoto camera 108 in a zoom view. The digital content 216 that is captured by the telephoto camera 108 of the wireless device 202 is an example of the zoom preview image 114 that is displayable in the viewfinder user interface 112 on the display screen 110 of the device.

In this example 200, the wireless device 202 includes the image viewfinder module 104 that implements features of telephoto camera viewfinder, as described herein and generally as shown and described with reference to FIG. 1. The image viewfinder module 104 may be implemented as a module that includes independent processing, memory, and/or logic components functioning as a computing and/or electronic device integrated with the wireless device 202. Alternatively or in addition, the image viewfinder module 104 can be implemented as a software application or software module, such as integrated with an operating system and as computer-executable software instructions that are executable with a processor (e.g., with the processor system 204) of the wireless device 202. As a software application or module, the image viewfinder module 104 can be stored on computer-readable storage memory (e.g., the memory 206 of the device), or in any other suitable memory device or electronic data storage implemented with the image viewfinder module. Alternatively or in addition, the image viewfinder module 104 may be implemented in firmware and/or at least partially in computer hardware. For example, at least part of the image viewfinder module 104 may be executable by a computer processor, and/or at least part of the image viewfinder module may be implemented in logic circuitry.

In implementations of telephoto camera viewfinder, the image viewfinder module 104 can receive inputs and user selections, such as a touch input 218 by a user of the wireless device 202 in the viewfinder user interface 112 on the display screen 110 (e.g., a touchscreen display) of the device. As described above, the viewfinder user interface 112 also includes the wide image capture icon 122 and includes the zoom image capture icon 124. A user of the wireless device 202 can select one of the image capture icons, such as with a touch selection in the viewfinder user interface 112 on the display screen 110 of the device. The image viewfinder module 104 can then receive the touch input 218 to initiate the digital camera 106 capturing the digital image 212 in the wide view of the camera scene responsive to the touch input 218 as a selection of the wide image capture icon 122.

Alternatively, the image viewfinder module 104 can receive the touch input 218 to initiate the telephoto camera 108 capturing the digital content 216 in the zoom view of the camera scene responsive to the touch input 218 as a selection of the zoom image capture icon 124. Additionally, the image viewfinder module 104 can receive the touch input 218 as a user selection of both the wide image capture icon 122 and the zoom image capture icon 124 approximately simultaneously. The image viewfinder module 104 can then initiate the capture of both the digital image 212 in the wide view of the camera scene with the digital camera 106 and the digital content 216 in the zoom view of the camera scene with the telephoto camera 108.

In other implementations, such as further shown and described with reference to FIG. 3, the image viewfinder module 104 can receive a touch input 218 as a user selection in the viewfinder user interface 112 on the display screen 110 of the wireless device 202 relative to the bordered outline of the region 120 (e.g., as bordered by the zoom view indication 118). For example, the image viewfinder module 104 can receive a touch input 218 as a touch selection 220 outside of the bordered outline of the region 120 (i.e., outside of the zoom view indication 118 on the camera preview image 116). Alternatively, the image viewfinder module 104 can receive a touch input 218 as a touch selection 222 inside of the bordered outline of the region 120 (i.e., inside of the zoom view indication 118 on the camera preview image 116).

In other implementations, such as further shown and described with reference to FIG. 3, the image viewfinder module 104 can receive a touch input 218 as a user selection in the viewfinder user interface 112 on the display screen 110 of the wireless device 202 to resize the bordered outline of the region 120. For example, the image viewfinder module 104 can receive a touch input 218 as a touch selection 224 to resize the bordered outline of the region 120 effective to zoom-out or further zoom-in the telephoto camera 108 with a telephoto zoom control 226.

Figure 3:
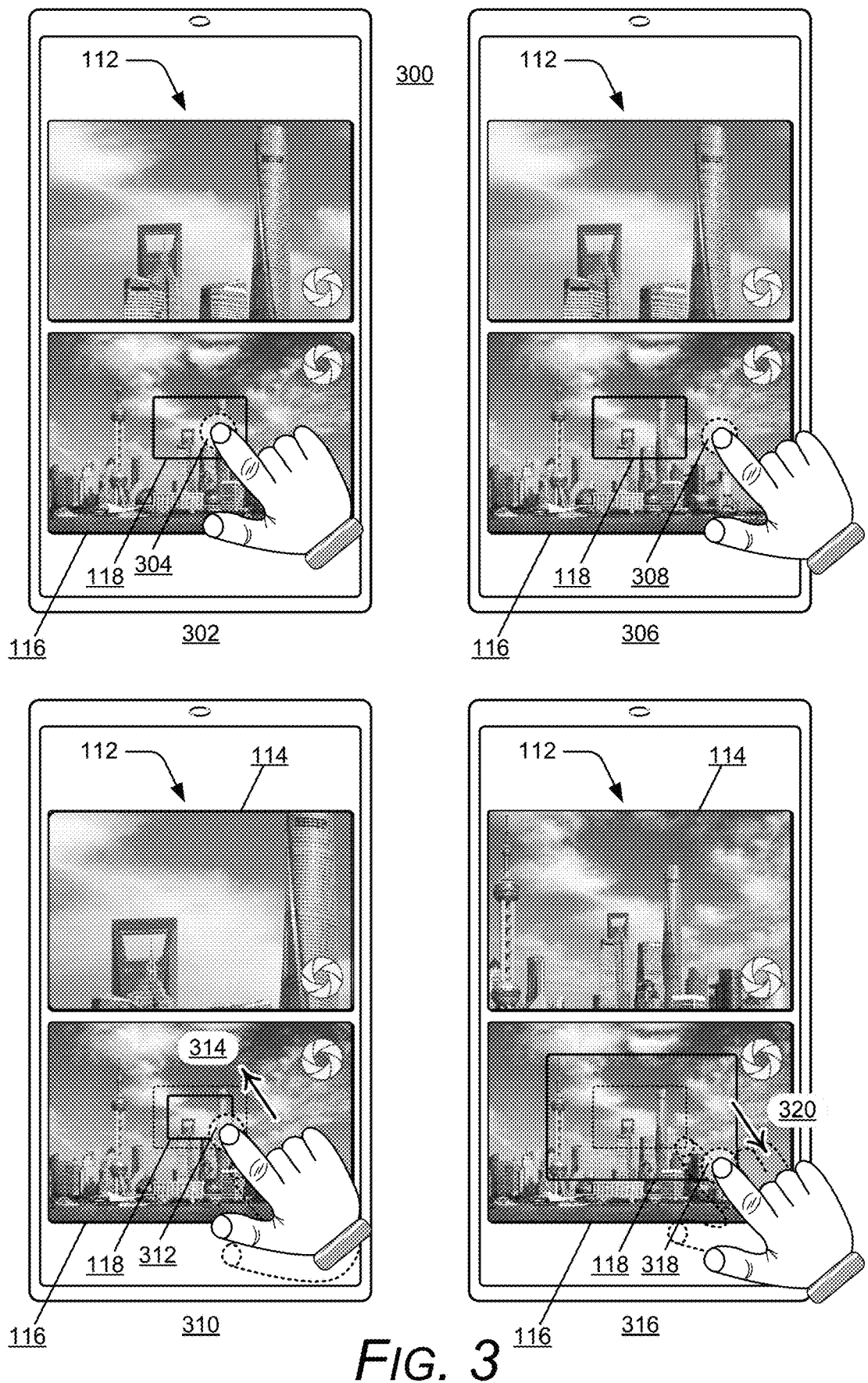
FIG. 3 illustrates examples of features for telephoto camera viewfinder using a multi-camera device in accordance with one or more implementations as described herein.

FIG. 3 illustrates examples 300 of features for telephoto camera viewfinder using a multi-camera device 102, as described herein. As shown in an example 302, a user of the multi-camera device 102 can touch select 304 the viewfinder user interface 112 on the display screen 110 of the device inside of the bordered outline of the region (e.g., inside of the zoom view indication 118). The image viewfinder module 104 can then receive the touch selection 222 inside of the bordered outline as a touch input 218, and communicate a control instruction to initiate the telephoto camera 108 capturing the digital content 216 in the zoom view of the camera scene. Similarly, as shown in an example 306, the user of the multi-camera device 102 can touch select 308 the viewfinder user interface 112 on the display screen 110 of the device outside of the bordered outline of the region (e.g., outside of the zoom view indication 118). The image viewfinder module 104 can then receive the touch selection 220 outside of the bordered outline as a touch input 218, and communicate a control instruction to initiate the digital camera 106 capturing the digital image 212 in the wide view of the camera scene.

In other aspects of telephoto camera viewfinder, a user of the multi-camera device 102 can resize the zoom view indication 118 on the camera preview image 116 of the wide view of the camera scene effective to zoom-out or further zoom-in the telephoto camera 108. For example, the user can touch select and drag a corner or side of the bordered outline of the region to either decrease or increase the size of the bordered outline, which is shown as a rectangle displayed over the camera preview image 116. As the user decreases the size of the bordered outline, the telephoto camera 108 further zooms-in, and as the user increases the size of the bordered outline, the telephoto camera 108 zooms-out.

As shown in an example 310, the user of the multi-camera device 102 can touch select 312 the bordered outline of the region in the viewfinder user interface 112 over the camera preview image 116 and drag across the display screen 110 in the direction 314 to decrease the size of the zoom view indication 118. The image viewfinder module 104 can receive the touch selection 224 to decrease the bordered outline of the region 120 as a touch input 218, and communicate the telephoto zoom control 226 to the telephoto camera 108 to further zoom-in responsive to the decrease in size of the bordered outline. This is also effective to alter the zoom preview image 114 displayed in the viewfinder user interface 112, which is an altered zoom view that is further zoomed-in as shown in this example 310.

Similarly, as shown in an example 316, the user of the multi-camera device 102 can touch select 318 the bordered outline of the region in the viewfinder user interface 112 over the camera preview image 116 and drag across the display screen 110 in the direction 320 to increase the size of the zoom view indication 118. The image viewfinder module 104 can receive the touch selection 224 to increase the size of the bordered outline of the region 120 as a touch input 218, and communicate the telephoto zoom control 226 to the telephoto camera 108 to zoom-out responsive to the increase in size of the bordered outline. This is also effective to alter the zoom preview image 114 displayed in the viewfinder user interface 112, which is an altered zoom view that is zoomed-out as shown in this example 316.

Figure 4:
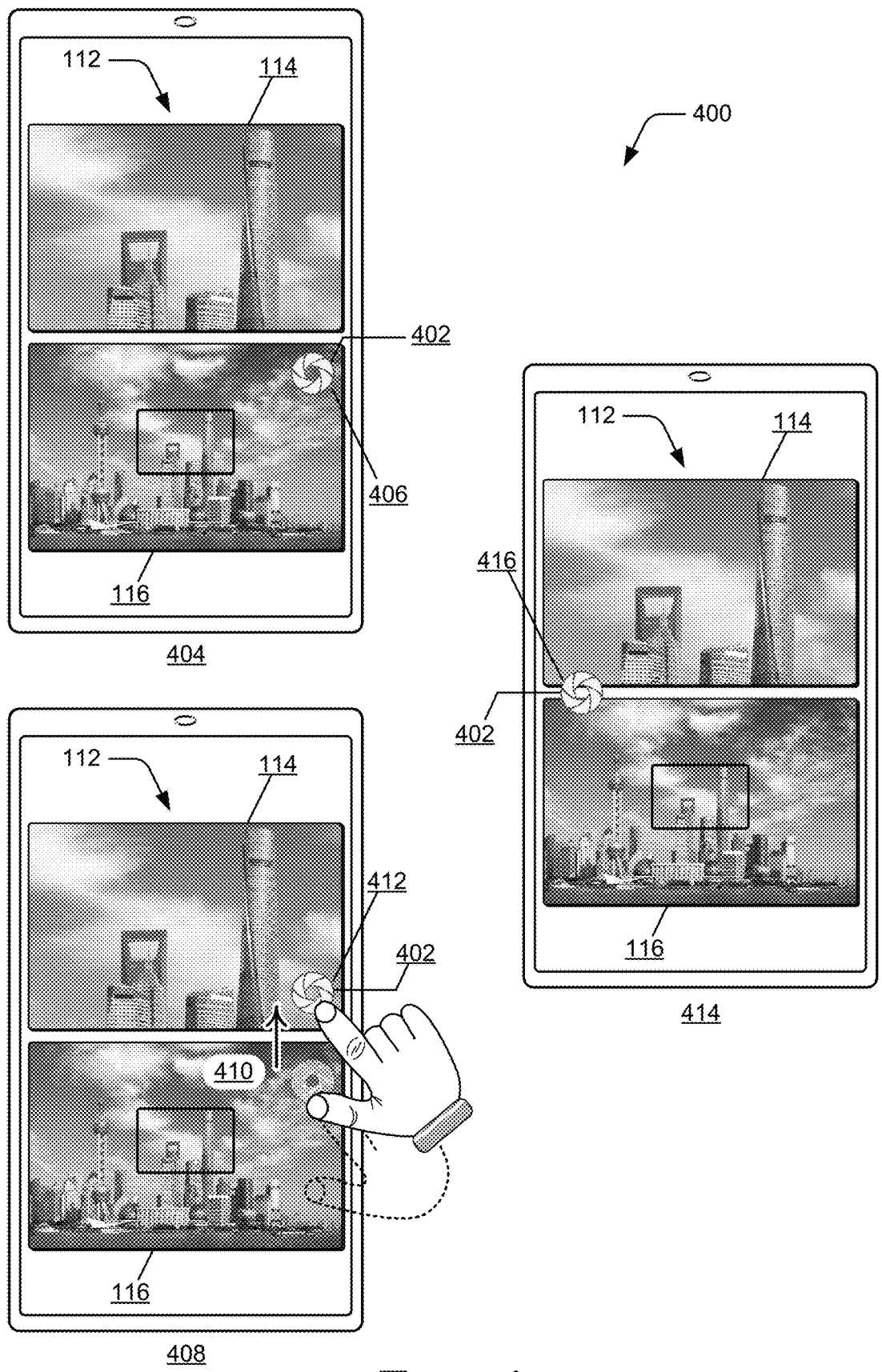
FIG. 4 illustrates additional examples of features for telephoto camera viewfinder using a multi-camera device in accordance with one or more implementations as described herein.

FIG. 4 illustrates additional examples 400 of features for telephoto camera viewfinder using a multi-camera device 102, as described herein. Rather than the viewfinder user interface 112 having both the wide image capture icon 122 and the zoom image capture icon 124 for user selection to initiate capturing the respective digital image in the wide view of the camera scene with the digital camera 106 and the digital content in the zoom view of the camera scene with the telephoto camera 108, the viewfinder user interface 112 includes one image capture icon 402 that is selectable and positionable anywhere in the viewfinder user interface. A user of the multi-camera device 102 can touch select and drag to position the image capture icon 402 over the zoom preview image 114, over the camera preview image 116, or position the image capture icon 402 over a portion of both of the zoom preview image 114 and the camera preview image 116.

As shown in an example 404, the image capture icon 402 is displayed at a position 406 over the camera preview image 116, and the user of the multi-camera device 102 can touch select the image capture icon 402 to initiate capturing the digital image in the wide view of the camera scene with the digital camera 106. The image viewfinder module 104 can receive a selection of the image capture icon 402 as a touch input 218 to initiate the digital camera 106 capturing the digital image 212 responsive to the selection of the image capture icon. The image capture icon 402 is selectable to position over the display of the camera preview image 116, and the user can initiate capturing the digital image 212 in the wide view of the camera scene with the digital camera 106 based on the position of the image capture icon over the display of the camera preview image. Alternatively, the image capture icon 402 is further selectable to position over the display of the zoom preview image 114, and the user can initiate capturing the digital content 216 in the zoom view of the camera scene with the telephoto camera 108 based on the position of the image capture icon over the display of the zoom preview image.

As shown in an example 408, the user of the multi-camera device 102 can select and drag the image capture icon 402 in the viewfinder user interface 112 across the display screen 110 in the direction 410 to reposition the image capture icon 402 over the zoom preview image 114 at a position 412. The user of the multi-camera device 102 can then touch select the image capture icon 402 to initiate capturing the digital content in the zoom view of the camera scene with the telephoto camera 108. The image viewfinder module 104 can receive a selection of the image capture icon 402 as a touch input 218 to initiate the telephoto camera 108 capturing the digital content 216 responsive to the selection of the image capture icon.

Notably, the user of the multi-camera device 102 can initiate a press and hold selection of the image capture icon 402 in the viewfinder user interface 112 to indicate moving the image capture icon to another position on the display. The user can then initiate another touch selection of the image capture icon 402 at the new display position in the viewfinder user interface 112 to initiate capturing the digital content with a camera. Alternatively, the image viewfinder module 104 can be implemented to recognize the press and hold selection of the image capture icon 402 as moving the image capture icon to another position on the display, and a release of the image capture icon at the new display position automatically initiates capturing the corresponding digital content at the new position of the image capture icon with a camera.

As shown in an example 414, the image capture icon 402 can be repositioned by the user of the multi-camera device 102 in the viewfinder user interface 112, such as to a position 416 over at least a portion of both the zoom preview image 114 and the camera preview image 116. The user of the device can then touch select the image capture icon 402 to initiate capturing both the digital image 212 in the wide view of the camera scene with the digital camera 106 and the digital content 216 in the zoom view of the camera scene with the telephoto camera 108. The image viewfinder module 104 can receive the selection of the image capture icon 402 that is positioned over at least a portion of both the zoom preview image 114 and the camera preview image 116 as a touch input 218 to initiate both the digital camera 106 capturing the digital image 212 and the telephoto camera 108 capturing the digital content 216 responsive to the selection of the image capture icon at the position 416.

Figure 5:
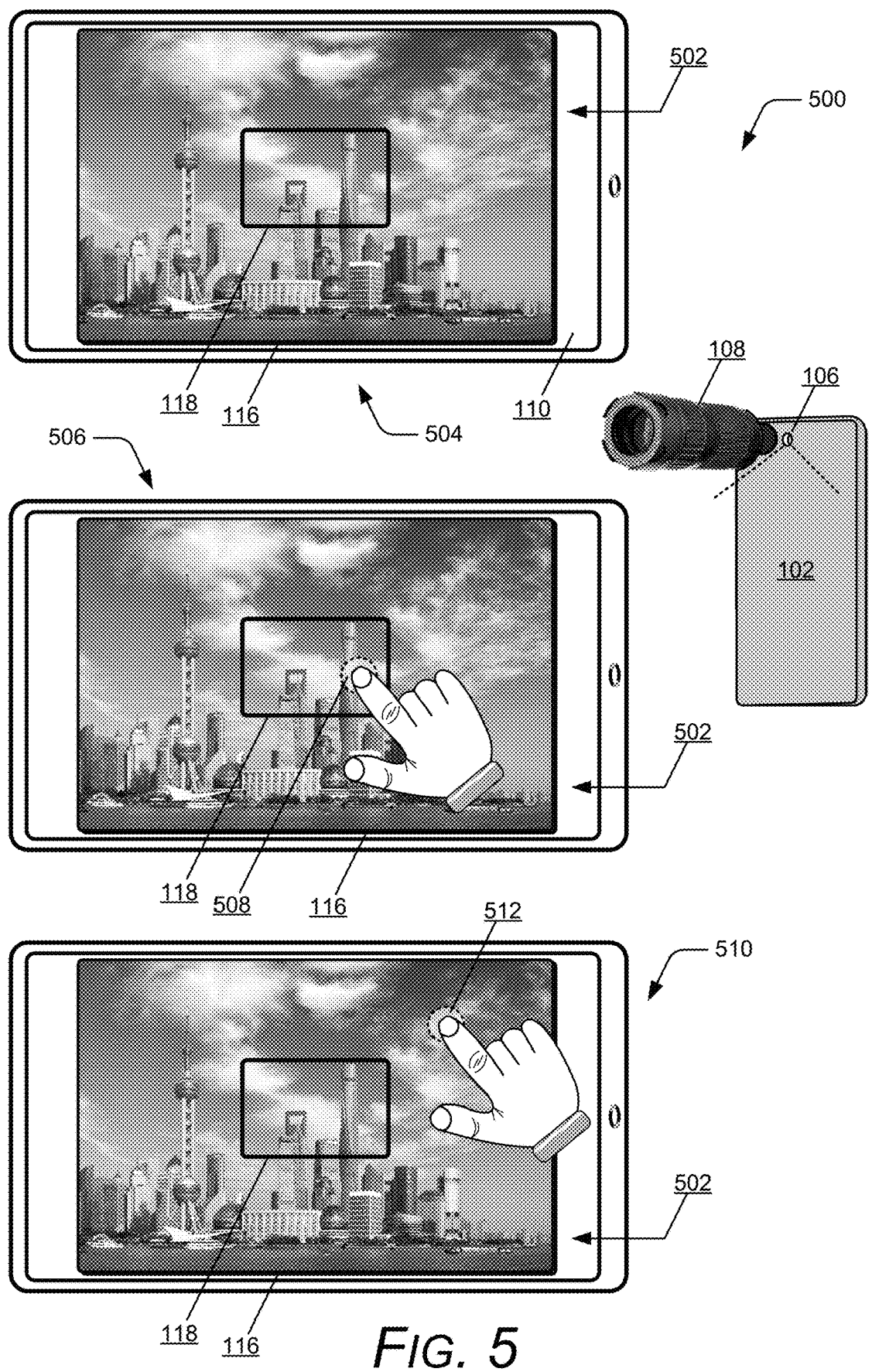
FIG. 5 further illustrates examples of features for telephoto camera viewfinder using a multi-camera device in accordance with one or more implementations as described herein.

FIG. 5 further illustrates examples 500 of features for telephoto camera viewfinder using a multi-camera device 102, as described herein. Rather than displaying both the zoom preview image 114 and the camera preview image 116 in the viewfinder user interface 112 on the display screen 110 of the multi-camera device, a viewfinder user interface 502 can include the wide view displayed as the camera preview image 116 captured by the digital camera 106. As shown in an example 504, the zoom view indication 118 is also displayed in the viewfinder user interface 502 as the bordered outline of a region of the camera scene over the camera preview image 116 to indicate the zoom view relative to the wide view of the camera scene.

As shown in an example 506, a user of the multi-camera device 102 can touch select 508 the viewfinder user interface 502 on the display screen 110 of the device inside of the bordered outline of the region (e.g., inside of the zoom view indication 118). The image viewfinder module 104 can then receive the touch selection 222 inside of the bordered outline as a touch input 218, and communicate a control instruction to initiate the telephoto camera 108 capturing the digital content 216 in the zoom view of the camera. Similarly, as shown in an example 510, the user of the multi-camera device 102 can touch select 512 the viewfinder user interface 502 on the display screen 110 of the device outside of the bordered outline of the region (e.g., outside of the zoom view indication 118). The image viewfinder module 104 can then receive the touch selection 220 outside of the bordered outline as a touch input 218, and communicate a control instruction to initiate the digital camera 106 capturing the digital image 212 in the wide view of the camera.

Example methods 600, 700, 800, 900, and 1000 are described with reference to FIGS. 6-10 in accordance with implementations of telephoto camera viewfinder. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
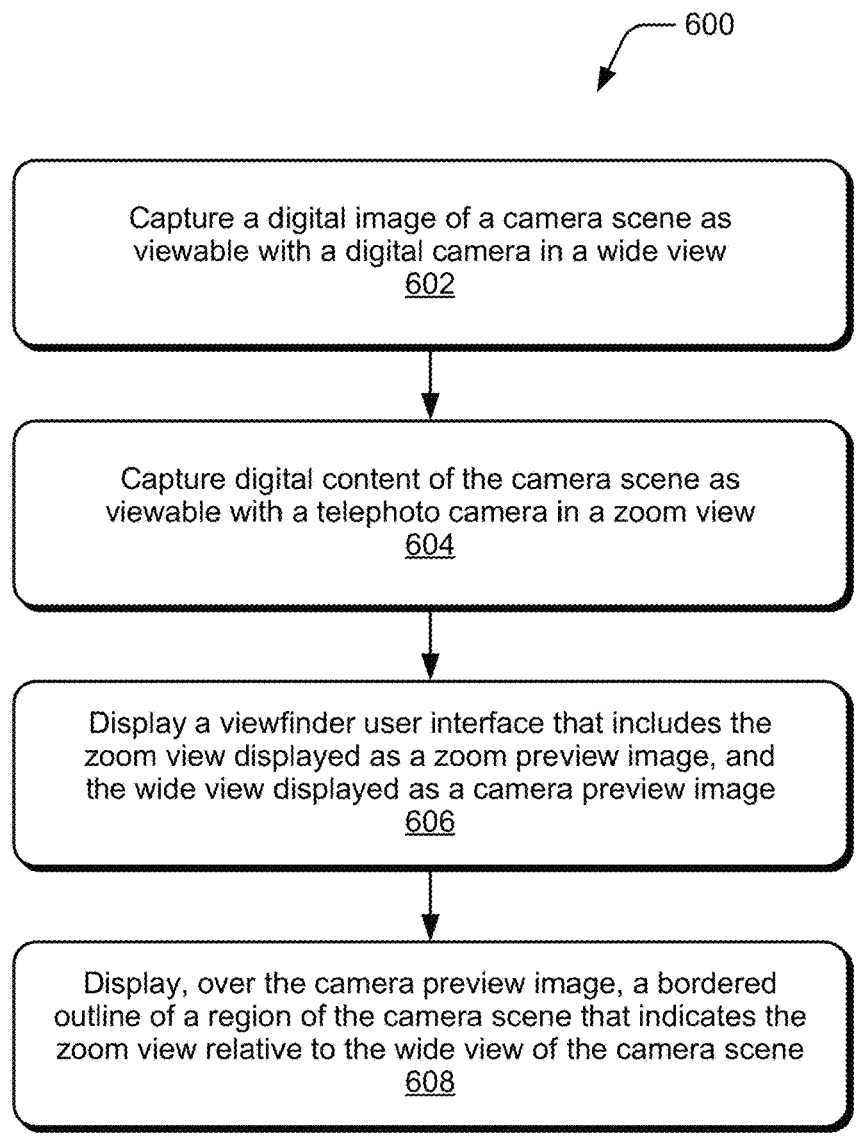
FIGS. 6-10 illustrate example methods of telephoto camera viewfinder in accordance with one or more implementations of the techniques described herein.

FIG. 6 illustrates example method(s) 600 of telephoto camera viewfinder, and is generally described with reference to a multi-camera device and an image viewfinder module implemented by the device. The order in which the method is described is not intended to be construed as a limitation, and any number or combination of the described method operations can be performed in any order to perform a method, or an alternate method.

At 602, a digital image of a camera scene is captured as viewable with a digital camera in a wide view. For example, the digital camera 106 of the multi-camera device 102 includes the imager 210 to capture a digital image 212, such as a digital photo or digital video content. The digital image 212 that is captured by the imager 210 of the digital camera 106 may be a digital photo of an environment as viewable with the digital camera, such as a digital image of a camera scene as viewable with the digital camera 106 in a wide view. The term "wide view" is relative to the "zoom view" of the telephoto camera 108, which generally has a narrower field-of-view than the wider field-of-view of the digital camera 106. The digital image 212 that is captured by the digital camera 106 of the multi-camera device 102 is an example of the camera preview image 116 that is displayable in the viewfinder user interface 112 on the display screen 110 of the device.

At 604, digital content of the camera scene is captured as viewable with a telephoto camera in a zoom view. For example, the telephoto camera 108 includes the imager 214 to capture digital content 216, such as a digital photo or digital video content. The digital content 216 that is captured by the imager 214 of the telephoto camera 108 may be a digital photo of the environment as viewable with the telephoto camera, such as a digital image of the camera scene as viewable with the telephoto camera 108 in a zoom view. The term "zoom view" is relative to the "wide view" of the digital camera 106, which generally has a wider field-of-view than the narrower field-of-view of the telephoto camera 108. The digital content 216 that is captured by the telephoto camera 108 of the multi-camera device 102 is an example of the zoom preview image 114 that is displayable in the viewfinder user interface 112 on the display screen 110 of the device.

At 606, a viewfinder user interface is displayed that includes the zoom view displayed as a zoom preview image, and includes the wide view displayed as a camera preview image. For example, the display screen 110 of the multi-camera device 102 displays the viewfinder user interface 112, which includes the zoom view displayed as a zoom preview image 114 captured by the telephoto camera 108, and includes the wide view displayed as a camera preview image 116 captured by the digital camera 106.

At 608, a bordered outline of a region of the camera scene that indicates the zoom view relative to the wide view of the camera scene is displayed over the camera preview image. For example, the viewfinder user interface 112 includes the display of the zoom view indication 118, which is displayed in the viewfinder user interface over the camera preview image 116 to indicate the zoom view relative to the wide view of the camera scene. The indication 118 of the zoom view can be displayed over the camera preview image 116 as the bordered outline of the region 120 of the camera scene that indicates the zoom view relative to the wide view. Notably, the region 120 of the camera scene corresponds to the zoom preview image 114 that is also displayed in the viewfinder user interface 112.

Figure 7:
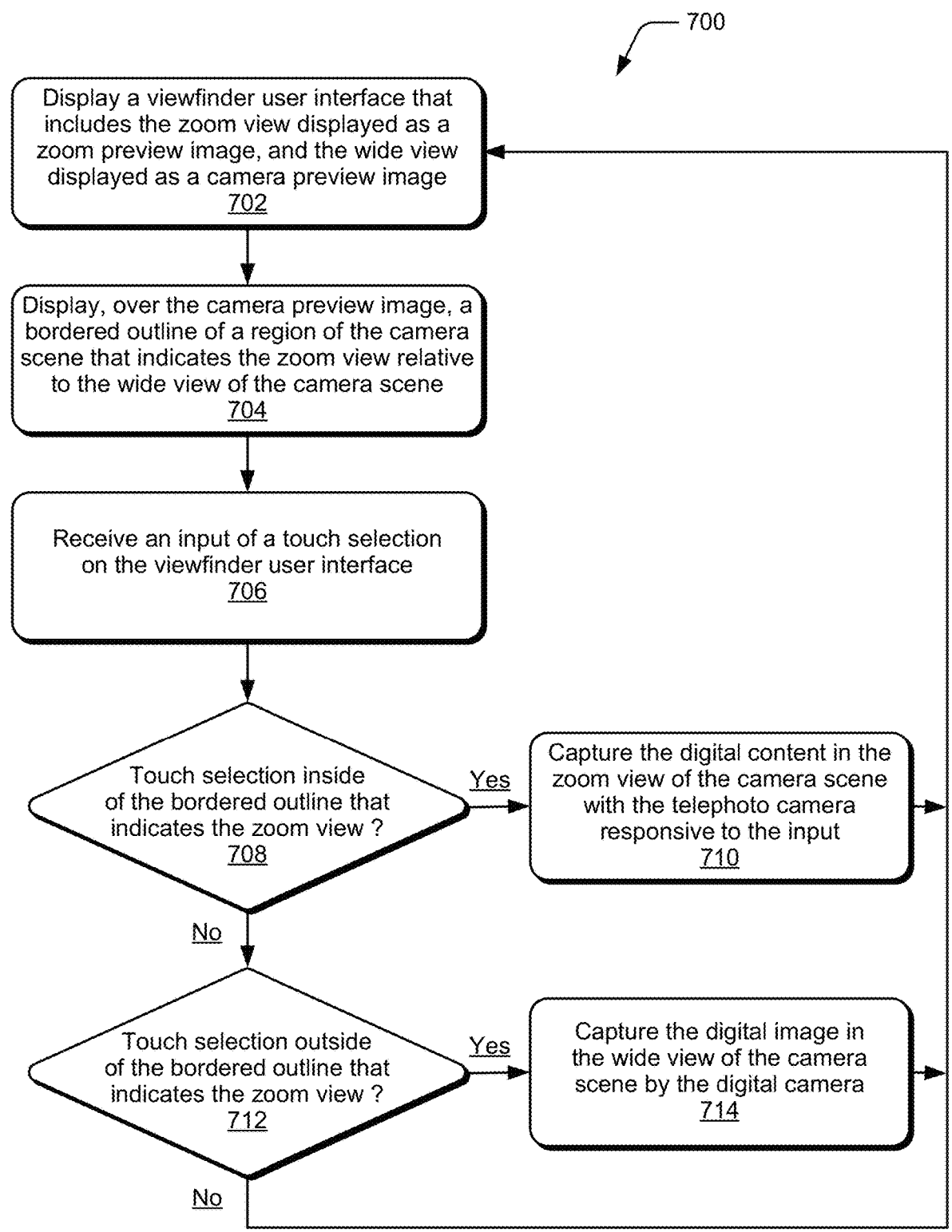

FIG. 7 illustrates example method(s) 700 of telephoto camera viewfinder, and is generally described with reference to a multi-camera device and an image viewfinder module implemented by the device. The order in which the method is described is not intended to be construed as a limitation, and any number or combination of the described method operations can be performed in any order to perform a method, or an alternate method.

At 702, a viewfinder user interface is displayed that includes the zoom view displayed as a zoom preview image, and includes the wide view displayed as a camera preview image. For example, the display screen 110 of the multi-camera device 102 displays the viewfinder user interface 112, which includes the zoom view displayed as a zoom preview image 114 captured by the telephoto camera 108, and includes the wide view displayed as a camera preview image 116 captured by the digital camera 106.

At 704, a bordered outline of a region of the camera scene that indicates the zoom view relative to the wide view of the camera scene is displayed over the camera preview image. For example, the viewfinder user interface 112 includes the display of the zoom view indication 118, which is displayed in the viewfinder user interface over the camera preview image 116 to indicate the zoom view relative to the wide view of the camera scene. The indication 118 of the zoom view can be displayed over the camera preview image 116 as the bordered outline of the region 120 of the camera scene that indicates the zoom view relative to the wide view. Notably, the region 120 of the camera scene corresponds to the zoom preview image 114 that is also displayed in the viewfinder user interface 112.

At 706, an input of a touch selection is received on the viewfinder user interface. For example, the image viewfinder module 104 that is implemented by the multi-camera device 102 can receive inputs and user selections, such as a touch input 218 by a user of the multi-camera device in the viewfinder user interface 112 on the display screen 110 (e.g., a touchscreen display) of the device.

At 708, a determination is made as to whether the input of the touch selection on the viewfinder user interface is inside of the bordered outline of the region that indicates the zoom view. For example, the image viewfinder module 104 that is implemented by the multi-camera device 102 can receive a touch input 218 as a touch selection 222 inside of the bordered outline of the region 120 (i.e., inside of the zoom view indication 118 on the camera preview image 116). As shown in the example 302, the image viewfinder module 104 can determine the touch selection 304 in the viewfinder user interface 112 on the display screen 110 of the device is inside of the bordered outline of the region (e.g., inside of the zoom view indication 118).

If the input of the touch selection on the viewfinder user interface is inside of the bordered outline of the region that indicates the zoom view (i.e., "Yes" from 708), then at 710, the digital content is captured in the zoom view of the camera scene with the telephoto camera responsive to the input. For example, the image viewfinder module 104 can receive the touch selection 222 inside of the bordered outline as a touch input 218, and communicate a control instruction to initiate the telephoto camera 108 capturing the digital content 216 in the zoom view of the camera scene responsive to the touch input.

If the input of the touch selection on the viewfinder user interface is not inside of the bordered outline of the region that indicates the zoom view (i.e., "No" from 708), then at 712, a determination is made as to whether the input of the touch selection on the viewfinder user interface is outside of the bordered outline of the region that indicates the zoom view. For example, the image viewfinder module 104 that is implemented by the multi-camera device 102 can receive a touch input 218 as a touch selection 220 outside of the bordered outline of the region 120 (i.e., outside of the zoom view indication 118 on the camera preview image 116). As shown in the example 306, the image viewfinder module 104 can determine the touch selection 308 in the viewfinder user interface 112 on the display screen 110 of the device is outside of the bordered outline of the region (e.g., outside of the zoom view indication 118).

If the input of the touch selection on the viewfinder user interface is outside of the bordered outline of the region that indicates the zoom view (i.e., "Yes" from 712), then at 714, the digital image is captured in the wide view of the camera scene by the digital camera responsive to the input. For example, the image viewfinder module 104 can receive the touch selection 220 outside of the bordered outline as a touch input 218, and communicate a control instruction to initiate the digital camera 106 capturing the digital image 212 in the wide view of the camera scene responsive to the touch input.

If the input of the touch selection on the viewfinder user interface is not outside of the bordered outline of the region that indicates the zoom view (i.e., "No" from 712), then the method continues at 702 to display the viewfinder user interface 112, which includes the zoom preview image 114 and the camera preview image 116, as well as the zoom view indication 118 displayed over the camera preview image 116 to indicate the zoom view relative to the wide view of the camera scene.

Figure 8:
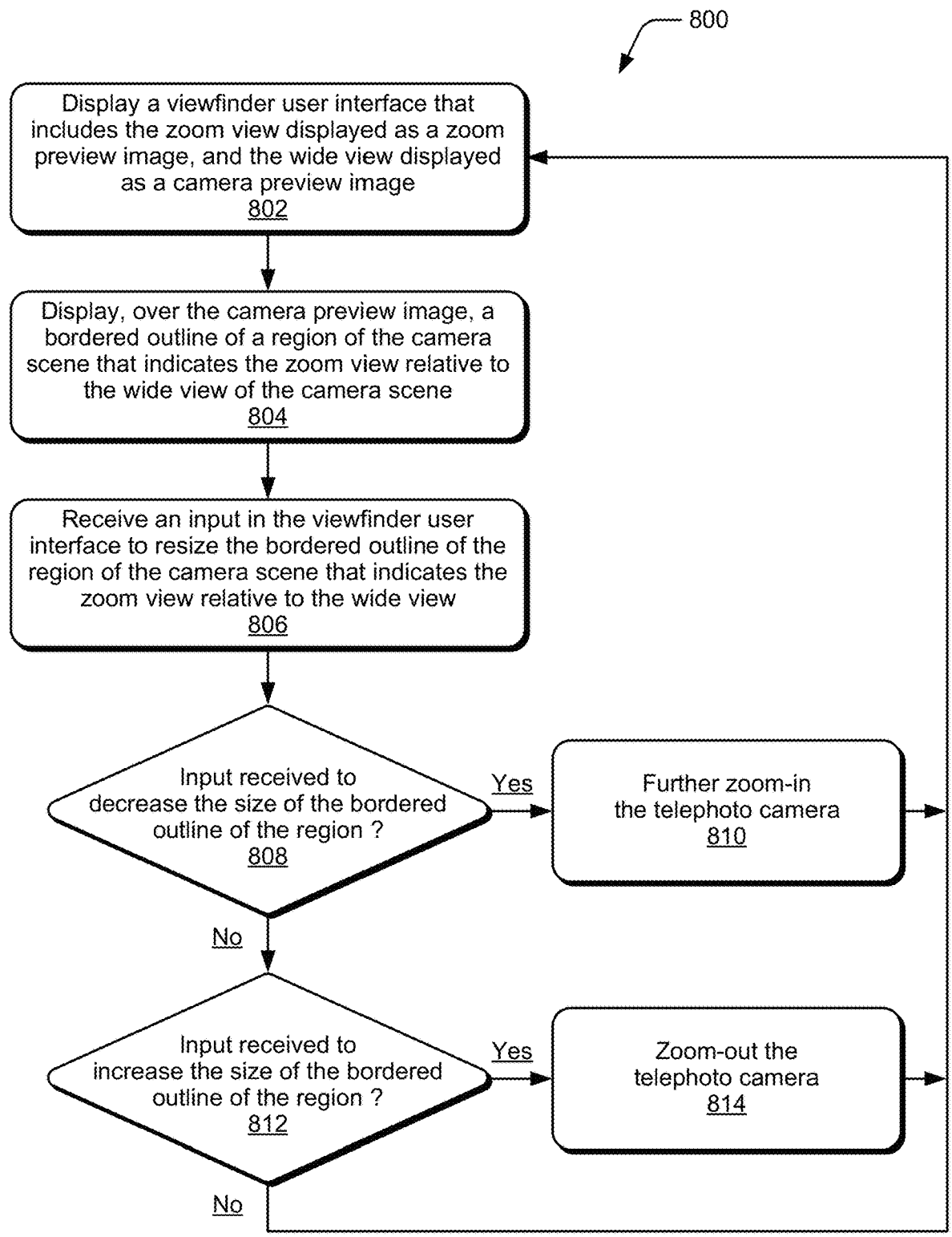

FIG. 8 illustrates example method(s) 800 of telephoto camera viewfinder, and is generally described with reference to a multi-camera device and an image viewfinder module implemented by the device. The order in which the method is described is not intended to be construed as a limitation, and any number or combination of the described method operations can be performed in any order to perform a method, or an alternate method.

At 802, a viewfinder user interface is displayed that includes the zoom view displayed as a zoom preview image, and includes the wide view displayed as a camera preview image. For example, the display screen 110 of the multi-camera device 102 displays the viewfinder user interface 112, which includes the zoom view displayed as a zoom preview image 114 captured by the telephoto camera 108, and includes the wide view displayed as a camera preview image 116 captured by the digital camera 106.

At 804, a bordered outline of a region of the camera scene that indicates the zoom view relative to the wide view of the camera scene is displayed over the camera preview image. For example, the viewfinder user interface 112 includes the display of the zoom view indication 118, which is displayed in the viewfinder user interface over the camera preview image 116 to indicate the zoom view relative to the wide view of the camera scene. The indication 118 of the zoom view can be displayed over the camera preview image 116 as the bordered outline of the region 120 of the camera scene that indicates the zoom view relative to the wide view. Notably, the region 120 of the camera scene corresponds to the zoom preview image 114 that is also displayed in the viewfinder user interface 112.

At 806, an input is received in the viewfinder user interface to resize the bordered outline of the region of the camera scene that indicates the zoom view relative to the wide view. For example, the image viewfinder module 104 that is implemented by the multi-camera device 102 can receive a touch input 218 as a user selection in the viewfinder user interface 112 on the display screen 110 of the multi-camera device 102 to resize the bordered outline of the region 120. The image viewfinder module 104 can receive a touch input 218 as a touch selection 224 to resize the bordered outline of the region 120 effective to zoom-out or further zoom-in the telephoto camera 108 with the telephoto zoom control 226.

At 808, a determination is made as to whether the input in the viewfinder user interface is received to decrease the size of the bordered outline of the region of the camera scene that indicates the zoom view relative to the wide view. For example, the image viewfinder module 104 that is implemented by the multi-camera device 102 can receive a touch input 218 as the touch selection 224 to decrease the size of the bordered outline of the region 120 of the camera scene.

If the input in the viewfinder user interface is received to decrease the size of the bordered outline of the region of the camera scene that indicates the zoom view relative to the wide view (i.e., "Yes" from 808), then at 810, the telephoto camera is further zoomed-in. For example, the image viewfinder module 104 that is implemented by the multi-camera device 102 can communicate the telephoto zoom control 226 to the telephoto camera 108 to further zoom-in responsive to the decrease in size of the bordered outline. This is also effective to alter the zoom preview image 114 displayed in the viewfinder user interface 112, which is an altered zoom view that corresponds to the decrease in the size of the bordered outline and the further zoom-in of the telephoto camera.

If the input in the viewfinder user interface is not received to decrease the size of the bordered outline of the region of the camera scene that indicates the zoom view relative to the wide view (i.e., "No" from 808), then at 812, a determination is made as to whether the input in the viewfinder user interface is received to increase the size of the bordered outline of the region of the camera scene that indicates the zoom view relative to the wide view. For example, the image viewfinder module 104 that is implemented by the multi-camera device 102 can receive a touch input 218 as the touch selection 224 to increase the size of the bordered outline of the region 120 of the camera scene.

If the input in the viewfinder user interface is received to increase the size of the bordered outline of the region of the camera scene that indicates the zoom view relative to the wide view (i.e., "Yes" from 812), then at 814, the telephoto camera is zoomed-out. For example, the image viewfinder module 104 that is implemented by the multi-camera device 102 can communicate the telephoto zoom control 226 to the telephoto camera 108 to zoom-out responsive to the increase in size of the bordered outline. This is also effective to alter the zoom preview image 114 displayed in the viewfinder user interface 112, which is an altered zoom view that corresponds to the increase in the size of the bordered outline and the zoom-out of the telephoto camera.

If the input in the viewfinder user interface is not received to increase the size of the bordered outline of the region of the camera scene that indicates the zoom view relative to the wide view (i.e., "No" from 812), then the method continues at 802 to display the viewfinder user interface 112, which includes the zoom preview image 114 and the camera preview image 116, as well as the zoom view indication 118 displayed over the camera preview image 116 to indicate the zoom view relative to the wide view of the camera scene.

Figure 9:
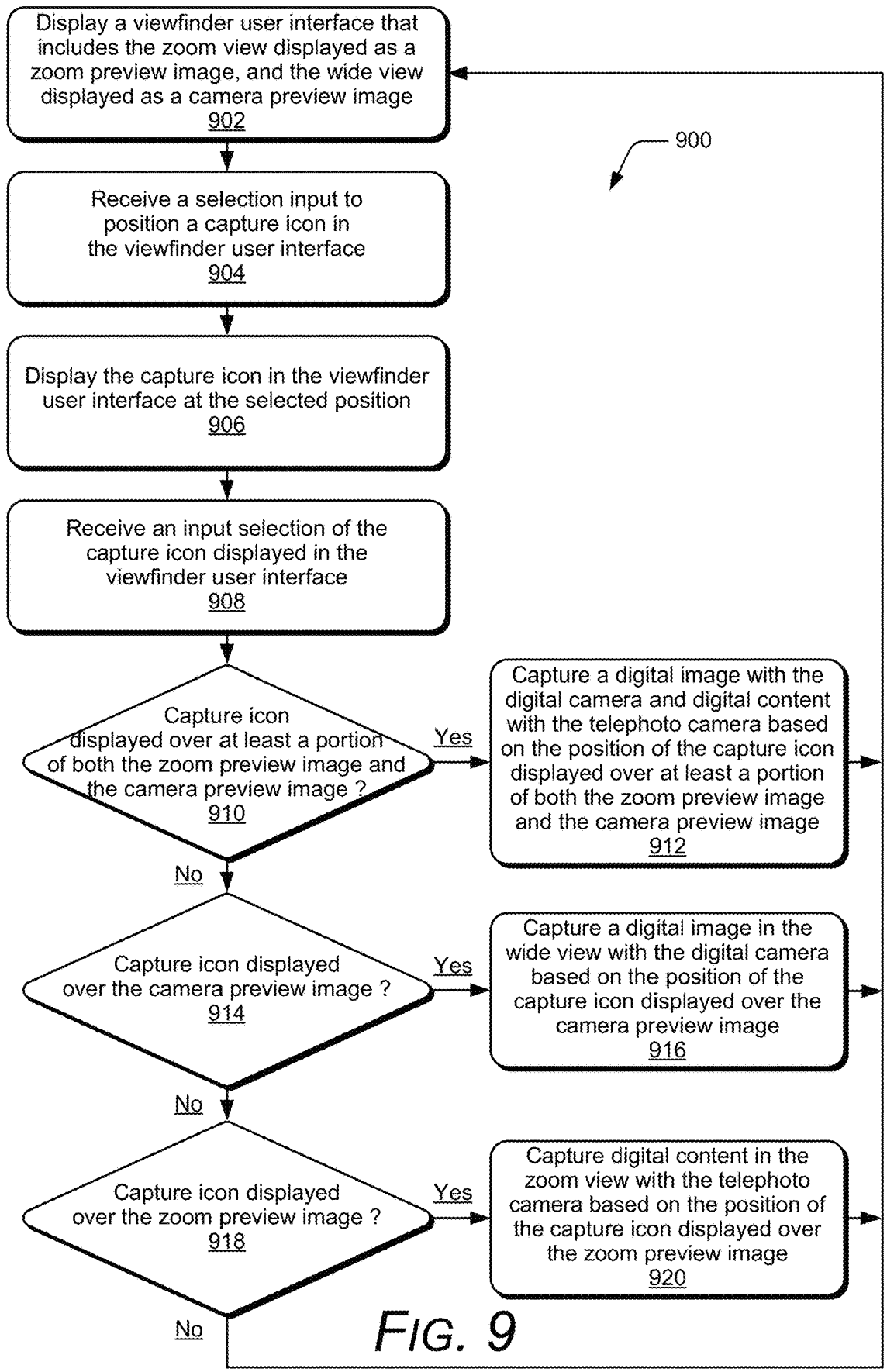

FIG. 9 illustrates example method(s) 900 of telephoto camera viewfinder, and is generally described with reference to a multi-camera device and an image viewfinder module implemented by the device. The order in which the method is described is not intended to be construed as a limitation, and any number or combination of the described method operations can be performed in any order to perform a method, or an alternate method.

At 902, a viewfinder user interface is displayed that includes the zoom view displayed as a zoom preview image, and includes the wide view displayed as a camera preview image. For example, the display screen 110 of the multi-camera device 102 displays the viewfinder user interface 112, which includes the zoom view displayed as a zoom preview image 114 captured by the telephoto camera 108, and includes the wide view displayed as a camera preview image 116 captured by the digital camera 106. The viewfinder user interface 112 also includes the display of the zoom view indication 118, which is displayed in the viewfinder user interface over the camera preview image 116 to indicate the zoom view relative to the wide view of the camera scene.

At 904, a selection input is received to position a capture icon in the viewfinder user interface. For example, the image viewfinder module 104 that is implemented by the multi-camera device 102 can receive a touch input 218 as a user touch select and drag input in the viewfinder user interface 112 on the display screen 110 of the multi-camera device 102 to position the image capture icon 402 over the zoom preview image 114, over the camera preview image 116, or position the image capture icon 402 over a portion of both of the zoom preview image 114 and the camera preview image 116. In this example, the viewfinder user interface 112 includes one image capture icon 402 that is selectable and positionable anywhere in the viewfinder user interface.

At 906, the capture icon is displayed in the viewfinder user interface at the selected position. For example, the image capture icon 402 can be moved to a selected position in the viewfinder user interface 112, and the image capture icon is displayed at the selected position over the zoom preview image 114, over the camera preview image 116, or over a portion of both of the zoom preview image 114 and the camera preview image 116. At 908, an input selection of the capture icon displayed in the viewfinder user interface is received. For example, the image viewfinder module 104 that is implemented by the multi-camera device 102 can receive an input selection of the image capture icon 402 that is displayed in the viewfinder user interface 112 as a touch input 218.

At 910, a determination is made as to whether the capture icon is displayed over at least a portion of both the zoom preview image and the camera preview image displayed in the viewfinder user interface. For example, the image capture icon 402 can be positioned by a user of the multi-camera device 102 in the viewfinder user interface 112, and the image viewfinder module 104 can determine the position 416 of the image capture icon 402 over at least a portion of both the zoom preview image 114 and the camera preview image 116.

If the capture icon is displayed over at least a portion of both the zoom preview image and the camera preview image displayed in the viewfinder user interface (i.e., "Yes" from 910), then at 912, a digital image is captured with the digital camera and digital content is captured with the telephoto camera based on the position of the capture icon over at least a portion of both the zoom preview image and the camera preview image displayed in the viewfinder user interface. For example, the image viewfinder module 104 can receive the input selection of the image capture icon 402 that is positioned over at least a portion of both the zoom preview image 114 and the camera preview image 116 as a touch input 218 to initiate both the digital camera 106 capturing the digital image 212 and the telephoto camera 108 capturing the digital content 216 responsive to the selection of the image capture icon at the position 416.

If the capture icon is not displayed over at least a portion of both the zoom preview image and the camera preview image displayed in the viewfinder user interface (i.e., "No" from 910), then at 914, a determination is made as to whether the capture icon is displayed over the camera preview image in the viewfinder user interface. For example, the image capture icon 402 can be positioned by a user of the multi-camera device 102 in the viewfinder user interface 112, and the image viewfinder module 104 can determine the position 406 of the image capture icon 402 over the camera preview image 116.

If the capture icon is displayed over the camera preview image in the viewfinder user interface (i.e., "Yes" from 914), then at 916, a digital image is captured in the wide view of the camera scene with the digital camera based on the position of the capture icon over the camera preview image displayed in the viewfinder user interface. For example, the image viewfinder module 104 can receive the input selection of the image capture icon 402 that is positioned over the camera preview image 116 as a touch input 218 to initiate the digital camera 106 capturing the digital image 212 in the wide view of the camera scene responsive to the selection of the image capture icon at the position 406.

If the capture icon is not displayed over the camera preview image in the viewfinder user interface (i.e., "No" from 914), then at 918, a determination is made as to whether the capture icon is displayed over the zoom preview image in the viewfinder user interface. For example, the image capture icon 402 can be positioned by a user of the multi-camera device 102 in the viewfinder user interface 112, and the image viewfinder module 104 can determine the position 412 of the image capture icon 402 over the zoom preview image 114.

If the capture icon is displayed over the zoom preview image in the viewfinder user interface (i.e., "Yes" from 918), then at 920, digital content is captured in the zoom view of the camera scene with the telephoto camera based on the position of the capture icon over the zoom preview image displayed in the viewfinder user interface. For example, the image viewfinder module 104 can receive the input selection of the image capture icon 402 that is positioned over the zoom preview image 114 as a touch input 218 to initiate the telephoto camera 108 capturing the digital content 216 in the zoom view of the camera scene responsive to the selection of the image capture icon at the position 412.

If the capture icon is not displayed over the zoom preview image in the viewfinder user interface (i.e., "No" from 918), then the method continues at 902 to display the viewfinder user interface 112, which includes the zoom preview image 114 and the camera preview image 116, as well as the zoom view indication 118 displayed over the camera preview image 116 to indicate the zoom view relative to the wide view of the camera scene.

Figure 10:
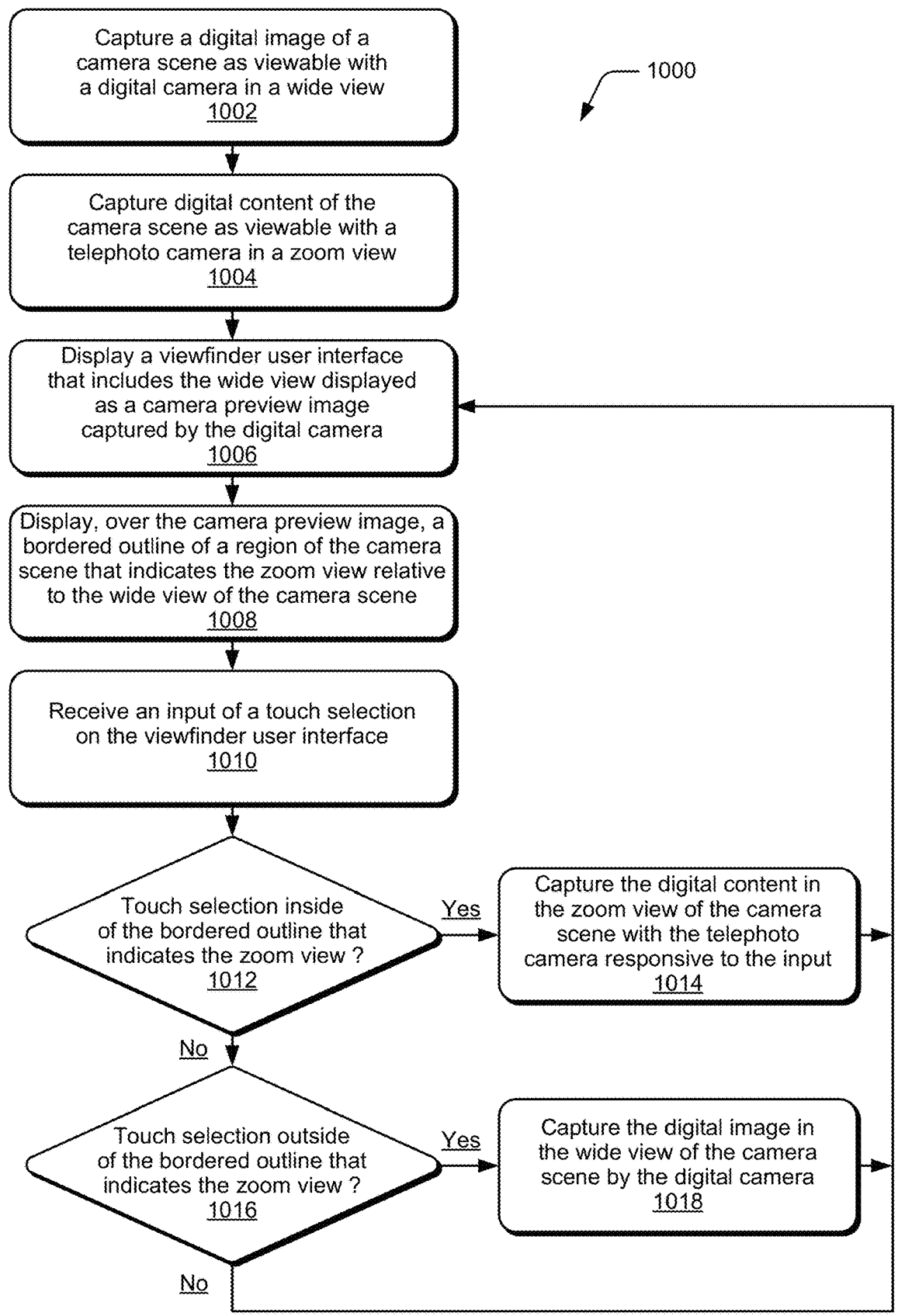

FIG. 10 illustrates example method(s) 1000 of telephoto camera viewfinder, and is generally described with reference to a multi-camera device and an image viewfinder module implemented by the device. The order in which the method is described is not intended to be construed as a limitation, and any number or combination of the described method operations can be performed in any order to perform a method, or an alternate method.

At 1002, a digital image of a camera scene is captured as viewable with a digital camera in a wide view. For example, the digital camera 106 of the multi-camera device 102 includes the imager 210 to capture a digital image 212, such as a digital photo or digital video content. The digital image 212 that is captured by the imager 210 of the digital camera 106 may be a digital photo of an environment as viewable with the digital camera, such as a digital image of a camera scene as viewable with the digital camera 106 in a wide view. The term "wide view" is relative to the "zoom view" of the telephoto camera 108, which generally has a narrower field-of-view than the wider field-of-view of the digital camera 106. The digital image 212 that is captured by the digital camera 106 of the multi-camera device 102 is an example of the camera preview image 116 that is displayable in the viewfinder user interface 502 on the display screen 110 of the device.

At 1004, digital content of the camera scene is captured as viewable with a telephoto camera in a zoom view. For example, the telephoto camera 108 includes the imager 214 to capture digital content 216, such as a digital photo or digital video content. The digital content 216 that is captured by the imager 214 of the telephoto camera 108 may be a digital photo of the environment as viewable with the telephoto camera, such as a digital image of the camera scene as viewable with the telephoto camera 108 in a zoom view. The term "zoom view" is relative to the "wide view"

of the digital camera 106, which generally has a wider field-of-view than the narrower field-of-view of the telephoto camera 108.

At 1006, a viewfinder user interface is displayed that includes the wide view displayed as a camera preview image captured by the digital camera. For example, the display screen 110 of the multi-camera device 102 displays the viewfinder user interface 502, which includes the wide view of the camera scene displayed as the camera preview image 116 captured by the digital camera 106.

At 1008, a bordered outline of a region of the camera scene that indicates the zoom view relative to the wide view of the camera scene is displayed over the camera preview image. For example, the viewfinder user interface 502 includes the display of the zoom view indication 118, which is displayed in the viewfinder user interface over the camera preview image 116 to indicate the zoom view relative to the wide view of the camera scene. The indication 118 of the zoom view can be displayed over the camera preview image 116 as the bordered outline of the region 120 of the camera scene that indicates the zoom view relative to the wide view.

At 1010, an input of a touch selection is received on the viewfinder user interface. For example, the image viewfinder module 104 that is implemented by the multi-camera device 102 can receive inputs and user selections, such as a touch input 218 by a user of the multi-camera device in the viewfinder user interface 502 on the display screen 110 (e.g., a touchscreen display) of the device.

At 1012, a determination is made as to whether the input of the touch selection on the viewfinder user interface is inside of the bordered outline of the region that indicates the zoom view. For example, the image viewfinder module 104 that is implemented by the multi-camera device 102 can receive a touch input 218 as a touch selection 222 inside of the bordered outline of the region 120 (i.e., inside of the zoom view indication 118 on the camera preview image 116). As shown in the example 506, the image viewfinder module 104 can determine the touch selection 508 in the viewfinder user interface 502 on the display screen 110 of the device is inside of the bordered outline of the region (e.g., inside of the zoom view indication 118).

If the input of the touch selection on the viewfinder user interface is inside of the bordered outline of the region that indicates the zoom view (i.e., "Yes" from 1012), then at 1014, the digital content is captured in the zoom view of the camera scene with the telephoto camera responsive to the input. For example, the image viewfinder module 104 can receive the touch selection 222 inside of the bordered outline as a touch input 218, and communicate a control instruction to initiate the telephoto camera 108 capturing the digital content 216 in the zoom view of the camera scene responsive to the touch input.

If the input of the touch selection on the viewfinder user interface is not inside of the bordered outline of the region that indicates the zoom view (i.e., "No" from 1012), then at 1016, a determination is made as to whether the input of the touch selection on the viewfinder user interface is outside of the bordered outline of the region that indicates the zoom view. For example, the image viewfinder module 104 that is implemented by the multi-camera device 102 can receive a touch input 218 as a touch selection 220 outside of the bordered outline of the region 120 (i.e., outside of the zoom view indication 118 on the camera preview image 116). As shown in the example 510, the image viewfinder module 104 can determine the touch selection 512 in the viewfinder user interface 502 on the display screen 110 of the device is outside of the bordered outline of the region (e.g., outside of the zoom view indication 118).

If the input of the touch selection on the viewfinder user interface is outside of the bordered outline of the region that indicates the zoom view (i.e., "Yes" from 1016), then at 1018, the digital image is captured in the wide view of the camera scene by the digital camera responsive to the input. For example, the image viewfinder module 104 can receive the touch selection 220 outside of the bordered outline as a touch input 218, and communicate a control instruction to initiate the digital camera 106 capturing the digital image 212 in the wide view of the camera scene responsive to the touch input.

If the input of the touch selection on the viewfinder user interface is not outside of the bordered outline of the region that indicates the zoom view (i.e., "No" from 1016), then the method continues at 1006 to display the viewfinder user interface 502, which includes the wide view of the camera scene displayed as the camera preview image 116 captured by the digital camera 106, as well as the zoom view indication 118 displayed over the camera preview image 116 to indicate the zoom view relative to the wide view of the camera scene.

Figure 11:
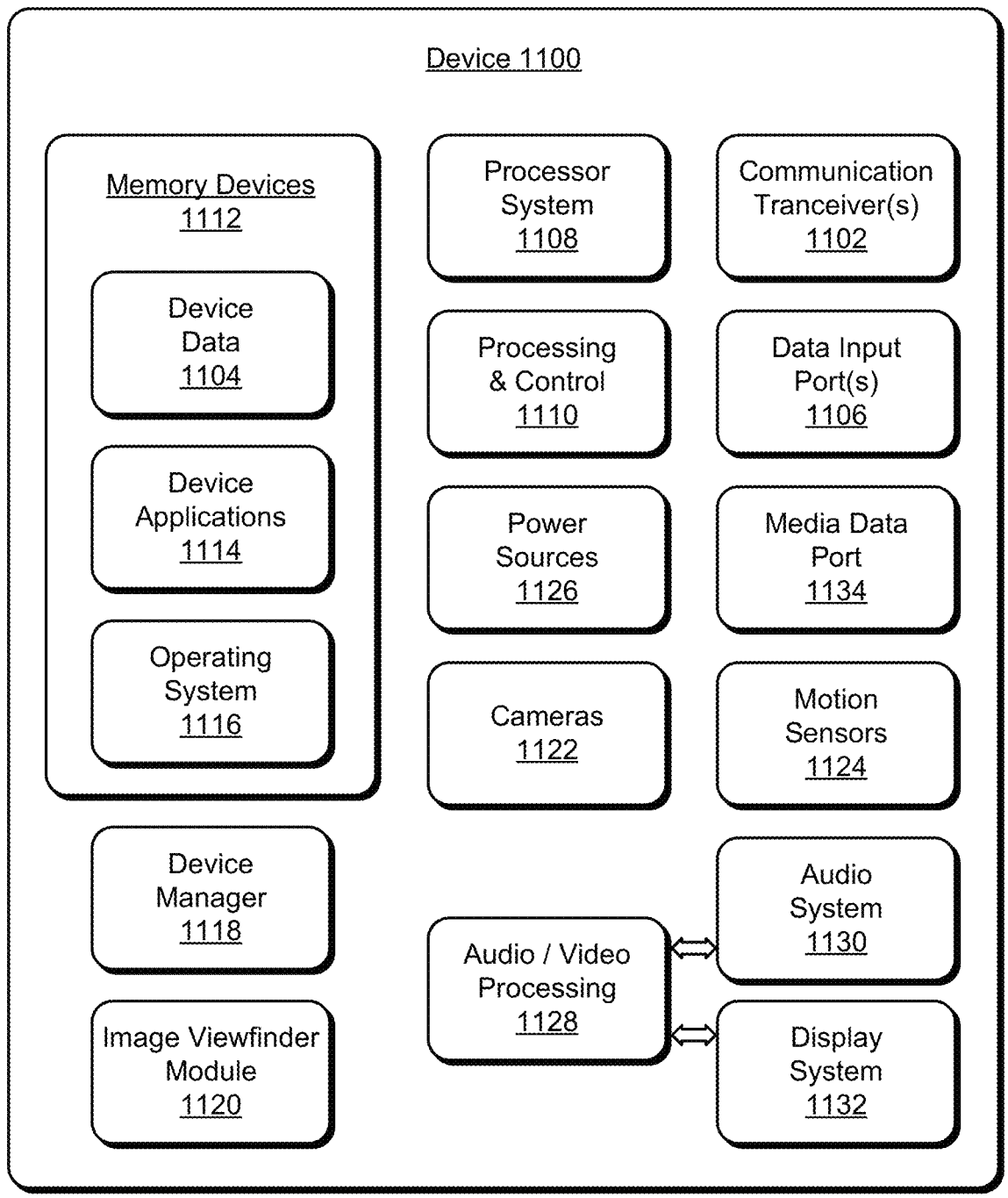
FIG. 11 illustrates various components of an example device that can used to implement the techniques for telephoto camera viewfinder as described herein.

FIG. 11 illustrates various components of an example device 1100, in which aspects of telephoto camera viewfinder can be implemented. The example device 1100 can be implemented as any of the devices described with reference to the previous FIGS. 1-10, such as any type of a mobile device, mobile phone, flip phone, client device, companion device, paired device, display device, tablet, computing, communication, entertainment, gaming, media playback, and/or any other type of computing and/or electronic device. For example, the multi-camera device 102 and the wireless device 202 described with reference to FIGS. 1 and 2 may be implemented as the example device 1100.

The device 1100 includes communication transceivers 1102 that enable wired and/or wireless communication of device data 1104 with other devices. The device data 1104 can include any of the various devices and image viewfinder module generated, determined, received, and/or stored data. Additionally, the device data 1104 can include any type of audio, video, and/or image data. Example communication transceivers 1102 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 1100 may also include one or more data input ports 1106 via which any type of data, media content, and/or inputs can be received, such as user-selectable inputs to the device, communications, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1100 includes a processor system 1108 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1110. The device 1100 may further include any type of a system bus or other data and command transfer system that couples the various components within the device. A system bus can include any one or combination of different bus structures and architectures, as well as control and data lines.

The device 1100 also includes memory and/or memory devices 1112 (e.g., computer-readable storage memory) that enable data storage, such as data storage devices that can be accessed by a computing device, and that provide persistent storage of data and executable instructions (e.g., software applications, programs, functions, and the like). Examples of the memory devices 1112 include volatile memory and non-volatile memory, fixed and removable media devices, and any suitable memory device or electronic data storage that maintains data for computing device access. The memory devices 1112 can include various implementations of random access memory (RAM), read-only memory (ROM), flash memory, and other types of storage media in various memory device configurations. The device 1100 may also include a mass storage media device.

The memory devices 1112 (e.g., as computer-readable storage memory) provides data storage mechanisms to store the device data 1104, other types of information and/or data, and various device applications 1114 (e.g., software applications and/or modules). For example, an operating system 1116 can be maintained as software instructions with a memory device and executed by the processor system 1108. The device applications 1114 may also include a device manager 1118, such as any form of a control application, software application, signal-processing and control module, code that is specific to a particular device, a hardware abstraction layer for a particular device, and so on.

In this example, the device 1100 includes an image viewfinder module 1120 that implements aspects of telephoto camera viewfinder. The image viewfinder module 1120 may be implemented with hardware components and/or in software as one of the device applications 1114, such as when the device 1100 is implemented as the multi-camera device 102 described with reference to FIG. 1, or as the wireless device 202 described with reference to FIG. 2. Examples of the image viewfinder module 1120 includes the image viewfinder module 104 that is implemented by the multi-camera device 102, and as described implemented by the wireless device 202, such as a software application and/or as hardware components in the multi-camera device and/or in the mobile device. In implementations, the image viewfinder module 1120 may include independent processing, memory, and logic components as a computing and/or electronic device integrated with the example device 1100.

In this example, the device 1100 also includes cameras 1122 and motion sensors 1124, such as may be implemented as components of an inertial measurement unit (IMU). The motion sensors 1124 can be implemented with various sensors, such as a gyroscope, an accelerometer, and/or other types of motion sensors to sense motion of the device. The motion sensors 1124 can generate sensor data vectors having three-dimensional parameters (e.g., rotational vectors in x, y, and z-axis coordinates) indicating location, position, acceleration, rotational speed, and/or orientation of the device. The device 1100 can also include one or more power sources 1126, such as when the device is implemented as a mobile device. The power sources may include a charging and/or power system, and can be implemented as a flexible strip battery, a rechargeable battery, a charged super-capacitor, and/or any other type of active or passive power source.

The device 1100 can also include an audio and/or video processing system 1128 that generates audio data for an audio system 1130 and/or generates display data for a display system 1132. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as via media data port 1134. In implementations, the audio system and/or the display system are integrated components of the example device. Alternatively, the audio system and/or the display system are external, peripheral components to the example device.

Although implementations of telephoto camera viewfinder have been described in language specific to features and/or methods, the subject of the appended claims is not necessarily limited to the specific features or methods described. Rather, the specific features and methods are disclosed as example implementations of telephoto camera viewfinder, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A multi-camera device, comprising: a digital camera to capture a digital image of a camera scene as viewable with the digital camera in a wide view; a telephoto camera to capture digital content of the camera scene as viewable with the telephoto camera in a zoom view; a display screen to display a viewfinder user interface that includes: the zoom view displayed as a zoom preview image captured by the telephoto camera; the wide view displayed as a camera preview image captured by the digital camera; and an indication of the zoom view displayed over the camera preview image to indicate the zoom view relative to the wide view of the camera scene.

Alternatively or in addition to the above described multi-camera device, any one or combination of: the indication of the zoom view is a bordered outline of a region of the camera scene that indicates the zoom view relative to the wide view. An image viewfinder module is implemented at least partially in computer hardware to: receive an input of a touch selection on the viewfinder user interface inside of the bordered outline of the region; and initiate to capture the digital content in the zoom view of the camera scene by the telephoto camera. The image viewfinder module is implemented to: receive an input of a touch selection on the viewfinder user interface outside of the bordered outline of the region; and initiate to capture the digital image in the wide view of the camera scene by the digital camera. The bordered outline of the region that indicates the zoom view relative to the wide view is selectable to initiate resizing the bordered outline and altering the zoom view. The image viewfinder module is implemented to: receive a selection input of the bordered outline of the region to decrease a size of the bordered outline; and initiate to further zoom-in the telephoto camera in response to the decrease in size of the bordered outline, effective to initiate displaying an altered zoom view as the zoom preview image in the viewfinder user interface. The image viewfinder module is implemented to: receive a selection input of the bordered outline of the region to increase a size of the bordered outline; and initiate to zoom-out the telephoto camera in response to the increase in size of the bordered outline, effective to initiate displaying an altered zoom view as the zoom preview image in the viewfinder user interface. The viewfinder user interface includes: a wide image capture icon that is selectable to initiate the capture of the digital image in the wide view of the camera scene with the digital camera; and a zoom image capture icon that is selectable to initiate the capture of the digital content in the zoom view of the camera scene with the telephoto camera. The image viewfinder module is implemented to: receive an input as an approximate simultaneous selection of the wide image capture icon and the zoom image capture icon; and initiate the capture of both the digital image in the wide view of the camera scene with the digital camera and the digital content in the zoom view of the camera scene with the telephoto camera. The viewfinder user interface includes a capture icon that is selectable to initiate at least one of the capture of the digital image in the wide view of the camera scene with the digital camera, or the capture of the digital content in the zoom view of the camera scene with the telephoto camera. The capture icon is further selectable to position over the display of the zoom preview image, and to initiate the capture of the digital content in the zoom view of the camera scene with the telephoto camera based on the position of the capture icon over the display of the zoom preview image. The capture icon is further selectable to position over the display of the camera preview image, and to initiate the capture of the digital image in the wide view of the camera scene with the digital camera based on the position of the capture icon over the display of the camera preview image. The capture icon is further selectable to position over at least a portion of both the zoom preview image and the camera preview image, and to initiate the capture of both the digital image in the wide view of the camera scene with the digital camera and the digital content in the zoom view of the camera scene with the telephoto camera. The multi-camera device further comprising: a telescope attachment to the multi-camera device to implement the telephoto camera and enable the zoom view; and a finder scope attached to the multi-camera device for an unobstructed field of view by the digital camera.

A method, comprising: capturing a digital image of a camera scene as viewable with a digital camera in a wide view; capturing digital content of the camera scene as viewable with a telephoto camera in a zoom view; displaying a viewfinder user interface that includes the zoom view displayed as a zoom preview image captured by the telephoto camera, and includes the wide view displayed as a camera preview image captured by the digital camera; and displaying, over the camera preview image, a bordered outline of a region of the camera scene that indicates the zoom view relative to the wide view of the camera scene.

Alternatively or in addition to the above described method, any one or combination of: receiving an input of a touch selection on the viewfinder user interface inside of the bordered outline of the region; and capturing the digital content in the zoom view of the camera scene by the telephoto camera responsive to the input. The method further comprising: receiving an input of a touch selection on the viewfinder user interface outside of the bordered outline of the region; and capturing the digital image in the wide view of the camera scene by the digital camera. The method further comprising: receiving an input to resize the bordered outline of the region of the camera scene that indicates the zoom view relative to the wide view; and one of: displaying an altered zoom view as the zoom preview image in the viewfinder user interface, the altered zoom view corresponding to a decrease in a size of the bordered outline and a further zoom-in of the telephoto camera; or displaying the altered zoom view as the zoom preview image in the viewfinder user interface, the altered zoom view corresponding to an increase in the size of the bordered outline and a zoom-out of the telephoto camera. The method further comprising: receiving an input selection of a capture icon displayed in the viewfinder user interface; and one of: the capturing of the digital image in the wide view of the camera scene with the digital camera based on a first position of the capture icon over the camera preview image displayed in the viewfinder user interface; the capturing of the digital content in the zoom view of the camera scene with the telephoto camera based on a second position of the capture icon over the zoom preview image displayed in the viewfinder user interface; or capturing both the digital image with the digital camera and the digital content with the telephoto camera based on a third position of the capture icon over at least a portion of both the zoom preview image and the camera preview image displayed in the viewfinder user interface.

A wireless device, comprising: a digital camera to capture a digital image of a camera scene as viewable with the digital camera in a wide view; a telephoto camera to capture digital content of the camera scene as viewable with the telephoto camera in a zoom view; and a display screen to display a viewfinder user interface that includes the wide view displayed as a camera preview image captured by the digital camera, and includes displayed over the camera preview image, a bordered outline of a region of the camera scene that indicates the zoom view relative to the wide view of the camera scene.

The invention claimed is:

1. A multi-camera device, comprising:
   a digital camera to capture a digital image of a camera scene as viewable with the digital camera in a wide view;
   a telephoto camera to capture digital content of the camera scene as viewable with the telephoto camera in a zoom view;
   a display screen to display a viewfinder user interface that includes:
      the zoom view displayed as a zoom preview image captured by the telephoto camera;
      the wide view displayed as a camera preview image captured by the digital camera;
      an indication of the zoom view displayed over the camera preview image to indicate the zoom view relative to the wide view of the camera scene; and
      a capture icon that is selectable to position over at least a portion of both the zoom preview image and the camera preview image, and the capture icon selectable to initiate the capture of both the digital image in the wide view of the camera scene with the digital camera and the digital content in the zoom view of the camera scene with the telephoto camera.

2. The multi-camera device as recited in claim 1, wherein the indication of the zoom view is a bordered outline of a region of the camera scene that indicates the zoom view relative to the wide view.

3. The multi-camera device as recited in claim 2, further comprising an image viewfinder module implemented at least partially in computer hardware to:
receive an input of a touch selection on the viewfinder user interface inside of the bordered outline of the region; and
initiate to capture the digital content in the zoom view of the camera scene by the telephoto camera.

4. The multi-camera device as recited in claim 2, further comprising an image viewfinder module implemented at least partially in computer hardware to:
receive an input of a touch selection on the viewfinder user interface outside of the bordered outline of the region; and
initiate to capture the digital image in the wide view of the camera scene by the digital camera.

5. The multi-camera device as recited in claim 2, wherein the bordered outline of the region that indicates the zoom view relative to the wide view is selectable to initiate resizing the bordered outline and altering the zoom view.

6. The multi-camera device as recited in claim 2, further comprising an image viewfinder module implemented at least partially in computer hardware to:
receive a selection input of the bordered outline of the region to decrease a size of the bordered outline; and
initiate to further zoom-in the telephoto camera in response to the decrease in size of the bordered outline, effective to initiate displaying an altered zoom view as the zoom preview image in the viewfinder user interface.

7. The multi-camera device as recited in claim 2, further comprising an image viewfinder module implemented at least partially in computer hardware to:
receive a selection input of the bordered outline of the region to increase a size of the bordered outline; and
initiate to zoom-out the telephoto camera in response to the increase in size of the bordered outline, effective to initiate displaying an altered zoom view as the zoom preview image in the viewfinder user interface.

8. The multi-camera device as recited in claim 1, wherein the viewfinder user interface includes:
a wide image capture icon that is selectable to initiate the capture of the digital image in the wide view of the camera scene with the digital camera; and
a zoom image capture icon that is selectable to initiate the capture of the digital content in the zoom view of the camera scene with the telephoto camera.

9. The multi-camera device as recited in claim 8, further comprising an image viewfinder module implemented at least partially in computer hardware to:
receive an input as an approximate simultaneous selection of the wide image capture icon and the zoom image capture icon; and
initiate the capture of both the digital image in the wide view of the camera scene with the digital camera and the digital content in the zoom view of the camera scene with the telephoto camera.

10. The multi-camera device as recited in claim 1, wherein the viewfinder user interface includes the capture icon that is selectable to initiate at least one of the capture of the digital image in the wide view of the camera scene with the digital camera, or the capture of the digital content in the zoom view of the camera scene with the telephoto camera.

11. The multi-camera device as recited in claim 10, wherein the capture icon is further selectable to position over the display of the zoom preview image, and to initiate the capture of the digital content in the zoom view of the camera scene with the telephoto camera based on the position of the capture icon over the display of the zoom preview image.

12. The multi-camera device as recited in claim 10, wherein the capture icon is further selectable to position over the display of the camera preview image, and to initiate the capture of the digital image in the wide view of the camera scene with the digital camera based on the position of the capture icon over the display of the camera preview image.

13. The multi-camera device as recited in claim 1, further comprising:
a telescope attachment to the multi-camera device to implement the telephoto camera and enable the zoom view; and
a finder scope attached to the multi-camera device for an unobstructed field of view by the digital camera.

14. A method, comprising:
capturing a digital image of a camera scene as viewable with a digital camera in a wide view;
capturing digital content of the camera scene as viewable with a telephoto camera in a zoom view;
displaying a viewfinder user interface that includes the zoom view displayed as a zoom preview image captured by the telephoto camera, the wide view displayed as a camera preview image captured by the digital camera, and a capture icon that is selectable to initiate the capture of at least one of the digital content in the zoom view of the camera scene or the digital image in the wide view of the camera scene; and
receiving a selection of the capture icon that is positioned over at least a portion of both the zoom preview image and the camera preview image to capture both the digital image in the wide view of the camera scene with the digital camera and the digital content in the zoom view of the camera scene with the telephoto camera.

15. The method as recited in claim 14, further comprising:
receiving an input of a touch selection on the viewfinder user interface inside of the bordered outline of the region; and
capturing the digital content in the zoom view of the camera scene by the telephoto camera responsive to the input.

16. The method as recited in claim 14, further comprising:
receiving an input of a touch selection on the viewfinder user interface outside of the bordered outline of the region; and
capturing the digital image in the wide view of the camera scene by the digital camera responsive to the input.

17. The method as recited in claim 14, further comprising:
receiving an input to resize the bordered outline of the region of the camera scene that indicates the zoom view relative to the wide view; and one of:
displaying an altered zoom view as the zoom preview image in the viewfinder user interface, the altered zoom view corresponding to a decrease in a size of the bordered outline and a further zoom-in of the telephoto camera; or
displaying the altered zoom view as the zoom preview image in the viewfinder user interface, the altered zoom view corresponding to an increase in the size of the bordered outline and a zoom-out of the telephoto camera.

18. The method as recited in claim 14, further comprising:
receiving an input selection of a capture icon displayed in the viewfinder user interface; and one of:
the capturing of the digital image in the wide view of the camera scene with the digital camera based on a first position of the capture icon over the camera preview image displayed in the viewfinder user interface; or
the capturing of the digital content in the zoom view of the camera scene with the telephoto camera based on a second position of the capture icon over the zoom preview image displayed in the viewfinder user interface.

19. A wireless device, comprising:
a digital camera to capture a digital image of a camera scene as viewable with the digital camera in a wide view;
a telephoto camera to capture digital content of the camera scene as viewable with the telephoto camera in a zoom view; and
a display screen to display a viewfinder user interface that includes:
the wide view displayed as a camera preview image captured by the digital camera;
the zoom view displayed as a zoom preview image captured by the telephoto camera; and
a capture icon that is selectable to position over at least a portion of both the zoom image and the wide view in the camera preview image, the capture icon being selectable to initiate the capture of both the digital image in the wide view of the camera scene with the digital camera and the digital content in the zoom view of the camera scene with the telephoto camera.

20. The wireless device as recited in claim 19, wherein:
the capture icon is repositionable over the zoom preview image and selectable to initiate capturing the digital content in the zoom view of the camera scene with the telephoto camera; and
the capture icon is repositionable over the camera preview image and selectable to initiate capturing the digital image in the wide view of the camera scene with the digital camera.

* * * * *